United States Patent
Choi

(10) Patent No.: US 7,695,002 B2
(45) Date of Patent: *Apr. 13, 2010

(54) SELECTIVELY DEPLOYABLE AIRBAG APPARATUS FOR VEHICLE AND CONTROL METHOD THEREOF

(75) Inventor: Hyeong Ho Choi, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 458 days.

This patent is subject to a terminal disclaimer.

(21) Appl. No.: 11/602,156

(22) Filed: Nov. 20, 2006

(65) Prior Publication Data

US 2007/0257473 A1 Nov. 8, 2007

(30) Foreign Application Priority Data

| May 8, 2006 | (KR) | ...................... 10-2006-0041221 |
| Jul. 18, 2006 | (KR) | ...................... 10-2006-0066928 |

(51) Int. Cl.
*B60R 21/01* (2006.01)
*B60R 21/233* (2006.01)

(52) U.S. Cl. .......................... 280/729; 280/735; 180/268

(58) Field of Classification Search .................. 280/735, 280/729; 180/268; 701/45
See application file for complete search history.

(56) References Cited

U.S. PATENT DOCUMENTS

| 5,174,600 | A | * | 12/1992 | Jahn et al. .................. 280/733 |
| 5,520,413 | A | * | 5/1996 | Mossi et al. ................. 280/729 |
| 6,139,052 | A | * | 10/2000 | Preamprasitchai .......... 280/735 |
| 6,276,716 | B1 | * | 8/2001 | Kato ........................... 280/735 |
| 6,616,177 | B2 | * | 9/2003 | Thomas et al. .............. 280/729 |
| 7,066,487 | B2 | * | 6/2006 | Sullivan et al. ............. 280/729 |
| 7,347,445 | B2 | * | 3/2008 | Choi ........................... 280/729 |
| 2003/0034638 | A1 | * | 2/2003 | Yoshida ....................... 280/729 |
| 2007/0267852 | A1 | * | 11/2007 | Enders ..................... 280/730.1 |

FOREIGN PATENT DOCUMENTS

KR 20-1998-048845 10/1998

* cited by examiner

*Primary Examiner*—Ruth Ilan
(74) *Attorney, Agent, or Firm*—Morgan, Lewis & Bockius LLP

(57) ABSTRACT

A selectively deployable airbag apparatus for vehicles includes: an impact detection sensor; a seat belt sensor; a first inflator and a second inflator; an airbag supplied with gas emitted from the first inflator and the second inflator and having a base chamber and a chest chamber separated from each other by a partition with at least one inner vent hole such that the base chamber and the chest chamber fluidly communicate with each other; and a controller receiving signals from the impact detection sensor and the seat belt sensor and operating the airbag to deploy, and determining whether to deploy the chest chamber or not based on whether the passenger has fastened the seat belt or not and an impact force.

18 Claims, 23 Drawing Sheets

(a)　　　　　　　　　　　　(b)

(c)

(a)

(b)

(c)

(d)

(a)      (b)

(c)      (d)

(e)

SELECTIVELY DEPLOYABLE AIRBAG APPARATUS FOR VEHICLE AND CONTROL METHOD THEREOF

CROSS-REFERENCE TO RELATED APPLICATION

This application claims priority to and the benefit of Korean Patent Application No. 10-2006-0041221, No. 10-2006-0066928 filed in the Korean Intellectual Property Office on May, 08, 2006 and on Jul. 18, 2006 the entire contents of which are incorporated herein by reference.

BACKGROUND OF THE INVENTION (a) Field of the Invention

The present invention relates to a selectively deployable airbag apparatus for vehicles and a control method thereof.

(b) Description of the Related Art

Generally, an airbag module is installed in a steering wheel or in a crash pad so as to protect a driver or a passenger in a vehicle crash. The airbag deploys in a crash to prevent a driver or a passenger from colliding with the crash pad or the wind shield, thereby reducing injuries.

A typical airbag has a one-chamber type structure. The deployed airbag protects the head and chest of an occupant, and deploys regardless of whether the occupant's seat belt has been fastened or hot.

If a frontal crash occurs when a passenger has fastened his/her seat belt, the lower body and the chest of the passenger are restrained by the seat belt, thereby preventing the passenger from colliding with the crash pad or the windshield. However, the head of the passenger is not protected.

In addition, though movement of the chest is limited by the seat belt, the airbag strikes the passenger's chest, which may be seriously injured.

If an airbag is deployed when the passenger seat is occupied by a baby or child, the airbag is deployed in the same manner as for adults, and serious injuries may occur.

In addition, if a baby or child stands on the seat or sits with bad posture, his/her chest and neck may be seriously injured by the airbag.

SUMMARY OF THE INVENTION

The present invention provides an airbag apparatus in which the airbag has a base chamber, a chest chamber, and first and second inflators for respectively supplying gas to the base chamber and the chest chamber. The airbag, the inflators, an inner vent hole, and an outer vent hole are selectively regulated depending on a vehicle crash level and whether or not a seat belt is fastened. The present invention also provides a control method of such an airbag apparatus.

An exemplary embodiment of the present invention provides a selectively deployable airbag apparatus including: an impact detection sensor detecting an impact acting on a vehicle body; a seat belt sensor detecting whether a passenger in the front passenger's seat has fastened his/her seat belt or not; first and second inflators; an airbag supplied with gas emitted from the first inflator and the second inflator and having a base chamber and a chest chamber separated from each other by a partition, which includes at least one inner vent hole such that the base chamber and the chest chamber fluidly communicate with each other through the inner vent hole; and a controller receiving a signal from the impact detection sensor and deploying the airbag, and determining whether or not to deploy the chest chamber according to a combination of whether the passenger's seat belt is fastened or not, which is detected by the seat belt sensor, and an impact force detected by the impact detection sensor.

The first inflator may be configured to supply gas to the base chamber, and the second inflator may be configured to supply gas to the chest chamber. The second inflator may be attached to a front portion of an airbag housing within the chest chamber. The second inflator may be disposed within the chest chamber, and may be configured to receive an electrical signal for controlling gas emission from the controller. The second inflator may use gas at a lower pressure than the first inflator.

The gas supplied to the base chamber from the first inflator may move into the chest chamber through the inner vent hole by pressure caused by a collision of the base chamber and the passenger.

The second inflator may emit gas after a predetermined time delay from a timing of gas emission of the first inflator, such that the base chamber is deployed first and then the chest chamber is deployed.

The inner vent hole may be circular or quadrangular.

The partition may a horizontal or slanted such that its upper end is slanted toward the passenger within the airbag.

The partition may include a first partition, whose end portions are spaced from each other at a left side and a right side of an inner bottom of the airbag and are upwardly extended, and a second partition disposed horizontally and connected to both upper ends of the first partition.

At least one inner vent hole may be provided in the first partition. One inner vent hole may be disposed at each of a left side and a right side of the first partition.

An end of the partition may be disposed at an inner side of an airbag housing and forwardly extended, and the other end of the partition may be connected to an inner side of a front end of the airbag.

The airbag may be provided with a tether for a stable deploying operation, one end of the tether being fixed to an inner side of the airbag, and the other end of the tether being connected to the second partition.

The base chamber may have a greater volume than the chest chamber and have a size sufficient to protect the head and the body part above the chest of the passenger, and the chest chamber may have a size sufficient to protect a body part below the chest of the passenger.

The base chamber may have a shape in which both of its lower ends are deployed adjacent to both knees of the passenger, and the chest chamber may have a shape in which the chest chamber is deployed between both lower ends of the base chamber.

The base chamber and the chest chamber of the airbag may each have outer vent holes through which gas supplied from the inflator is discharged to the outside.

The outer vent hole of the base chamber may be disposed at a position at which gas is not discharged directly to the passenger.

A tube through which gas generated by the second inflator is supplied may be provided inside the chest chamber. The tube may be at a center of the chest chamber or at both sides of the chest chamber.

The controller may receive a signal from the impact detection sensor and a signal indicating whether the passenger's seat belt is fastened, detected by the seat belt sensor. The controller may control only the first inflator to supply gas to the base chamber, in which case the chest chamber is supplied with gas from the base chamber, or may control both the first and second inflators to emit gas, thereby supplying gas to both the base chamber and the chest chamber so that gas moves according to a pressure difference between the base chamber and the chest chamber. The controller may selectively control the inflators depending on amount of impact even if the passenger's seat belt is not fastened.

A control method of a selectively deployable airbag apparatus for vehicles according to an exemplary embodiment of the present invention includes: detecting a vehicle crash if the front passenger seat is occupied; and selectively operating an airbag to deploy depending on whether or not the passenger's seat belt is fastened, the airbag deploying with a predetermined time delay.

The operating of the airbag may include operating only a first inflator to deploy a base chamber, if the passenger's seat belt is fastened.

The operating of the airbag may include operating a first inflator and a second inflator to deploy a base chamber and a chest chamber, if the passenger's seat belt is not fastened.

The predetermined time delay may be such that the base chamber is deployed first, and then the chest chamber is deployed, the chest chamber being deployed after the base chamber collides with the passenger and absorbs collision energy.

A control method of a selectively deployable airbag apparatus for vehicles according to another exemplary embodiment of the present invention includes: detecting impact force acting on a vehicle body if the front passenger seat is occupied; comparing the detected impact force to predetermined values; and determining whether the passenger's seat belt is fastened or not if the detected impact force is within a set range, and deploying the airbag by selectively operating a first inflator and a second inflator.

The comparing of the detected impact force may include a first impact force step set for low speed crashes, a second impact force step set for medium speed crashes, and a third impact force step set for high speed crashes.

The first impact force step may correspond to speeds of 14 mph or less. The second impact force step may correspond to speeds of 20 mph or less. The third impact force step may correspond to higher than 20 mph.

The deploying of the airbag may include a first deploying mode step of operating only the first inflator if the passenger's seat belt is fastened and the detected impact force is less than or equal to the second impact force.

The deploying of the airbag may include a second deploying mode step of operating only the first inflator if the passenger's seat belt is not fastened and the detected force is less than or equal to the second impact force.

The deploying of the airbag may include a third deploying mode step of operating only the first inflator if the passenger's seat belt is fastened and the detected impact force is greater than or equal to the third impact force.

The deploying of the airbag may include a fourth deploying mode step of operating both the first inflator and the second inflator if the passenger's seat belt is not fastened and the detected impact force is greater than or equal to the third impact force.

DETAILED DESCRIPTION OF THE PREFERRED EMBODIMENTS

Figure 1:
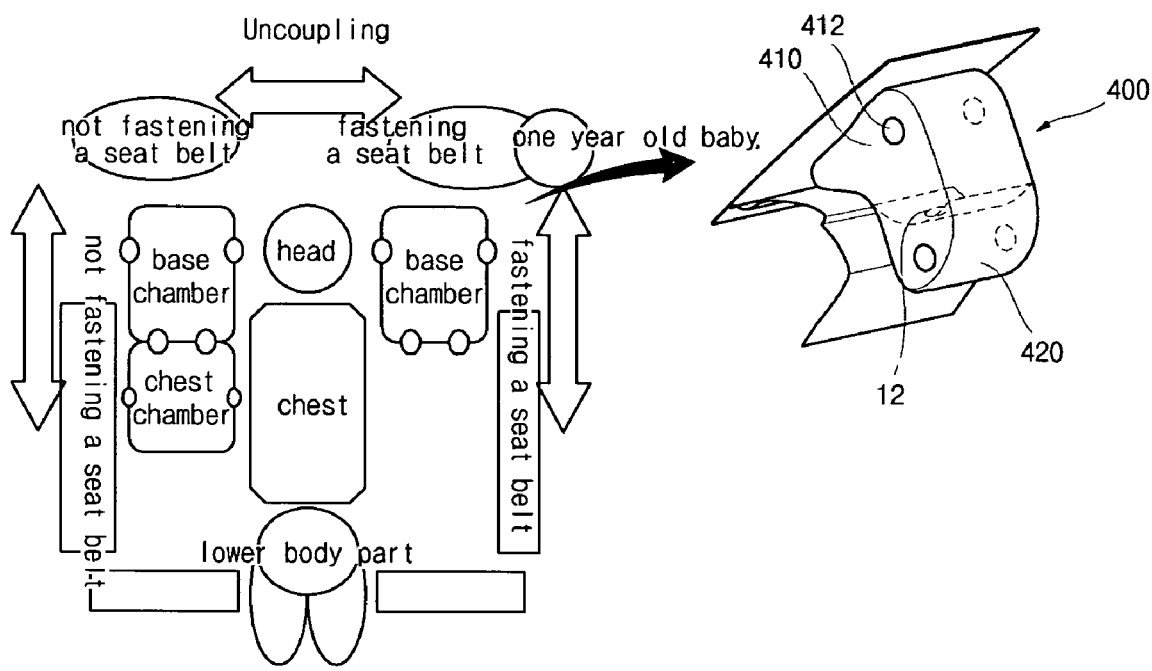
FIG. 1 is a block diagram schematically showing a selectively deployable airbag apparatus for vehicles according to an exemplary embodiment of the present invention.
Figure 2:
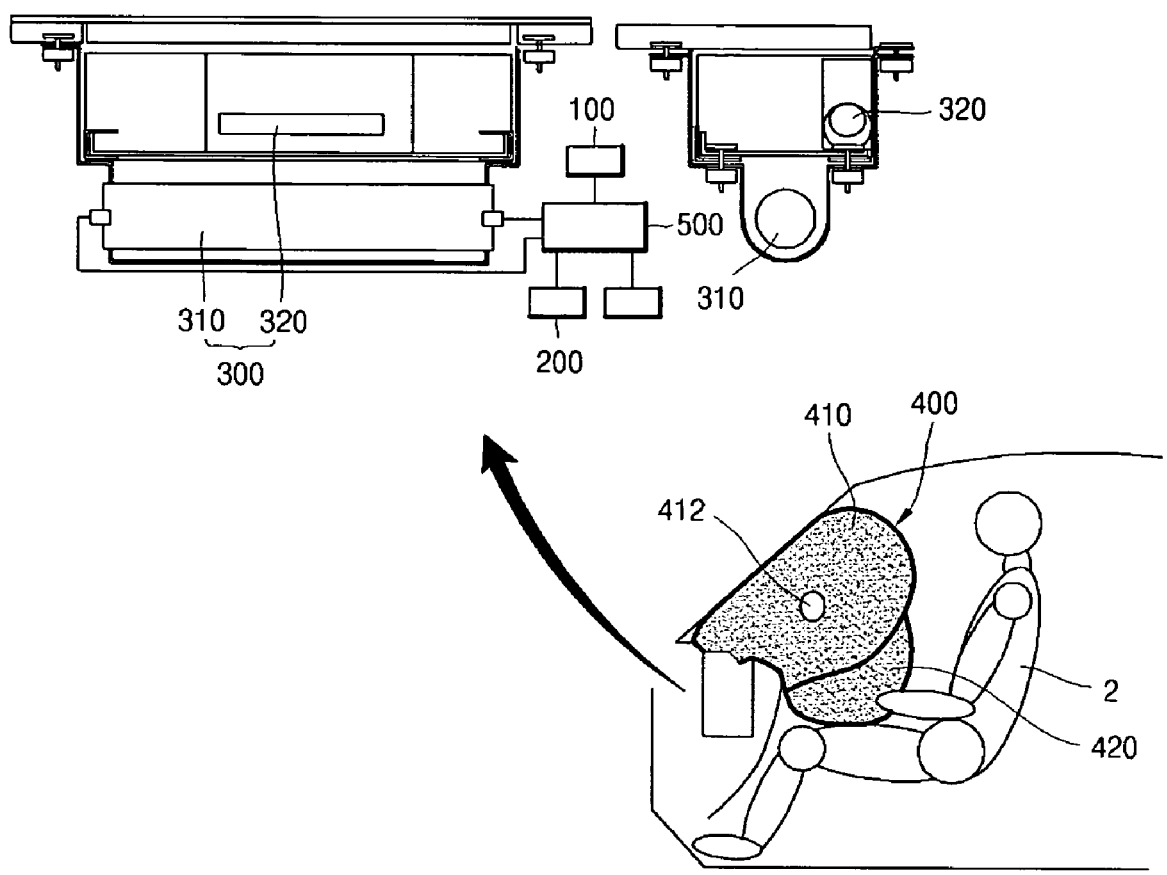
FIG. 2 is a drawing showing a selectively deployable airbag apparatus for vehicles according to an exemplary embodiment of the present invention.
Figure 3:
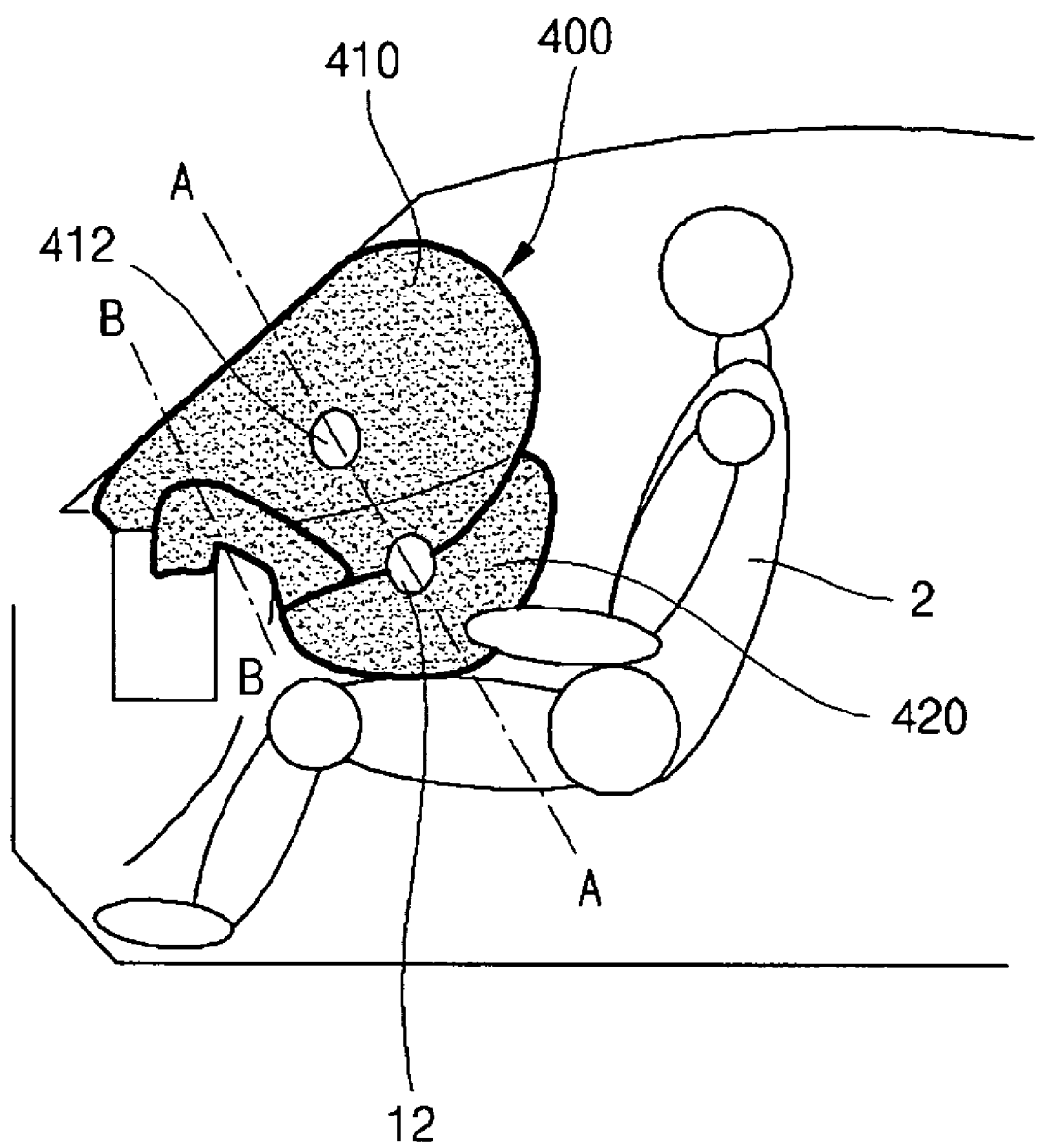
FIG. 3 is a cross-sectional view of a selectively deployable airbag apparatus for vehicles according to an exemplary embodiment of the present invention.

A selectively deployable airbag apparatus for vehicles according to an exemplary embodiment of the present invention and a control method thereof will hereinafter be described in detail with reference to the accompanying drawings.

Referring to FIG. 1 to FIG. 4B, exemplary embodiments of the present invention provide an impact detection sensor 100 that senses an impact on the vehicle body during a collision. The impact detection sensor 100 may include an accelerometer that measures deceleration and acceleration of the vehicle.

The impact detection sensor 100 may be mounted to a front portion of the vehicle.

At least one inflator 300 is further provided. The inflator 300 may include a first inflator 310 and a second inflator 320. The first inflator 310 is installed within an airbag housing, and the second inflator 320 may be installed in the vicinity of the first inflator 310 or may be separately positioned within a chest chamber 420 and fixedly mounted to a front portion of the airbag housing.

An airbag 400 may include a base chamber 410 and a chest chamber 420 which is positioned below and in front of the base chamber 410. The base chamber 410 and the chest chamber 420 are partitioned by a partition 10, which includes at least one inner vent hole 12, and are respectively supplied with gases from the first inflator 310 and the second inflator 320. The chambers 410 and 420 are in fluid communication with each other through the inner vent hole 12, so that gas can freely move between the base chamber 410 and the chest chamber 420 depending on a pressure difference therebetween.

A control unit 500 receives signals from the impact detection sensor 100 and controls the airbag 400. The control unit 500 determines whether to operate the second inflator 320 depending on whether the passenger 2 has fastened his/her seat belt, which is detected by the seat belt sensor 200, and an impact force detected by the impact detection sensor 100. A detailed description of the control unit 500 will be provided below.

The first inflator 310 supplies gas to the base chamber 410, and the second inflator 320 supplies gas to the chest chamber 420.

The second inflator 320 may be installed within the airbag housing adjacent to the first inflator 310, or may be installed to a front portion of the airbag housing and disposed within the chest chamber 420.

The second inflator 320 uses lower pressure gas than the first inflator 310.

Gas in the base chamber 410 is transferred to the chest chamber 420 through the inner vent hole 12 by the pressure applied by the collision between the base chamber 410 and the passenger 2.

The second inflator 320 emits gas after a predetermined time delay from the gas emission of the first inflator 310 so that the base chamber 410 is inflated prior to the chest chamber 420.

The inner vent hole 12 may be circular or quadrangular.

The partition 10 may be disposed horizontally inside the airbag 400 or to be inclined such that an upper end thereof faces the passenger.

The partition 10 may include a first partition 14 and a second partition 16. End portions of the first partition 14 are spaced from each other at a left side and a right side of the bottom of the airbag 400 and are upwardly extended toward the upper portion of the airbag 400. The second partition 16 is horizontally extended and connected to both upper ends of the first partition 14.

At least one inner vent hole 12 is provided in the partition 14, and one vent hole 12 may be provided at each of left and right sides of the first partition 14.

One end of the partition 10 is connected to an inner side of the airbag housing and is extended forwardly, and the other end is connected to an inner side of a front end of the airbag 400.

A tether 20 is provided for a stable deploy of the airbag 400. One end of the tether 20 is fixed to both inner sides of the airbag 400 and is extended, and the other end of the tether 20 is connected to the second partition 16.

The base chamber 410 of the airbag 400 has a greater volume than the chest chamber 420, and has a size sufficient to protect the head and the body part above the chest of a passenger, and the chest chamber 420 has a size sufficient to protect the body part below the chest.

When the airbag 400 is deployed, both lower ends of the base chamber 410 are adjacent to the passenger's knees, and the chest chamber 420 is disposed between both lower ends of the base chamber 410.

The base chamber 410 may have an outer vent hole 412 through which gas can be discharged from the airbag 400 to the outside. The outer vent hole 412 is formed at a position in which the gas is not discharged directly toward the passenger.

A tube 30 through which gas generated by the second inflator 320 is supplied is provided inside the chest chamber 420.

The tube 30 forms a single conduit line at a center of the chest chamber 420, or two conduit lines at left and right sides of the chest chamber 420, through which gas generated by the second inflator 320 can flow.

The control unit 500 receives a signal from the impact detection sensor 100 and a signal indicating whether the passenger's seat belt has been fastened from the seat belt sensor 200, and deploys the base chamber 410. The chest chamber 420 is supplied with gas from the base chamber 410. Alternatively, the control unit 500 deploys both the base chamber 410 and the chest chamber 420

If the passenger's seat belt is not fastened, the first inflator 310 or the second inflator 320 is selectively controlled depending on an amount of impact detected by the impact detection sensor 100 so as to deploy the base chamber 410 and the chest chamber 420.

Figure 8:
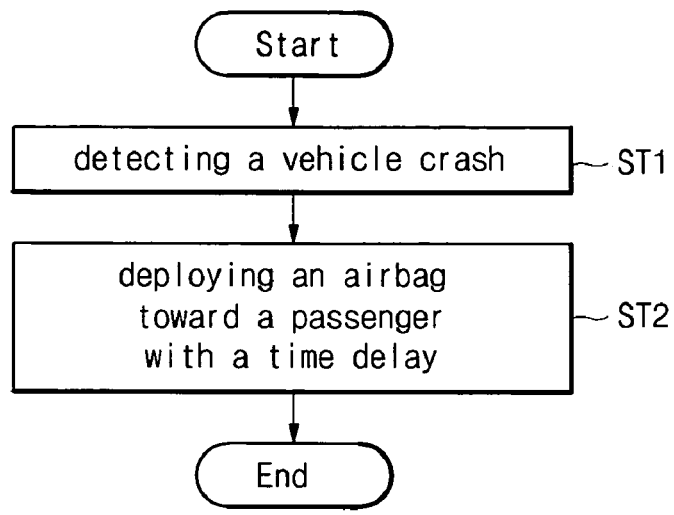
FIG. 8 is a flowchart showing a control method of a selectively deployable airbag apparatus for vehicles according to an exemplary embodiment of the present invention.
Figure 9:
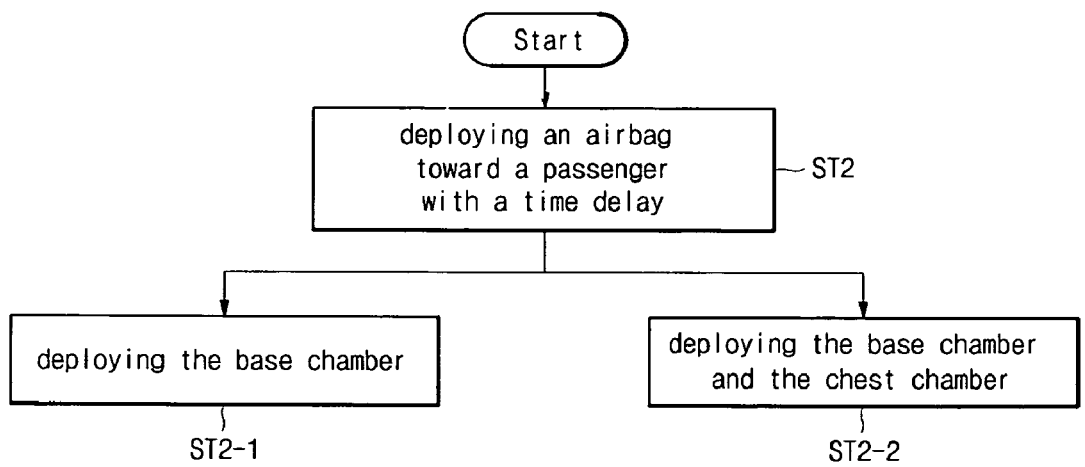
FIG. 9 is a flowchart of an airbag deploying process in a control method of a selectively deployable airbag apparatus for vehicles according to an exemplary embodiment of the present invention.
Figure 10:
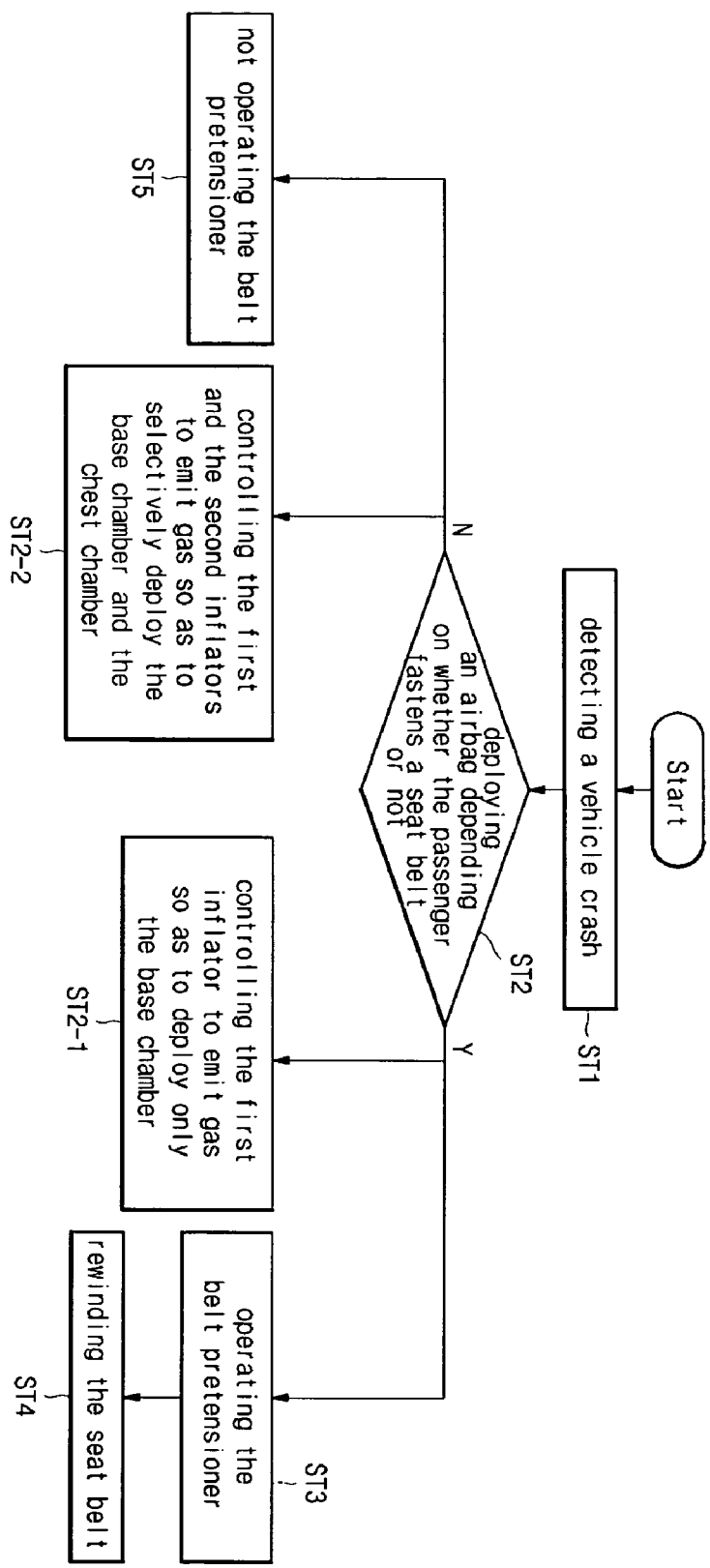
FIG. 10 is a flowchart showing operation states of a control method of a selectively deployable airbag apparatus for vehicles according to an exemplary embodiment of the present invention.

Referring to FIG. 8 to FIG. 9, an exemplary method of selectively deploying an airbag apparatus includes a step ST1 of detecting a vehicle crash when a front passenger seat is occupied, and an airbag deploying step ST2 in which the airbag is selectively deployed with a predetermined time delay depending on whether the passenger's seat belt is fastened or not.

The airbag deploying step ST2 includes a base chamber deploying operation step ST2-1 in which only the first inflator 310 emits gas so as to deploy the base chamber 410, if the passenger's seat belt is fastened.

The airbag deploying step ST2 includes a base chamber and chest chamber deploying operation step ST2-2 in which the first and the second inflators 310 and 320 both emit gas so as to deploy both the base chamber 410 and the chest chamber 420, if the passenger's seat belt is not fastened.

The time delay of the airbag deploying step ST2 is set such that the base chamber is deployed first and the chest chamber is then deployed. After the base chamber collides with the passenger and absorbs collision energy, the chest chamber is then deployed.

Figure 11:
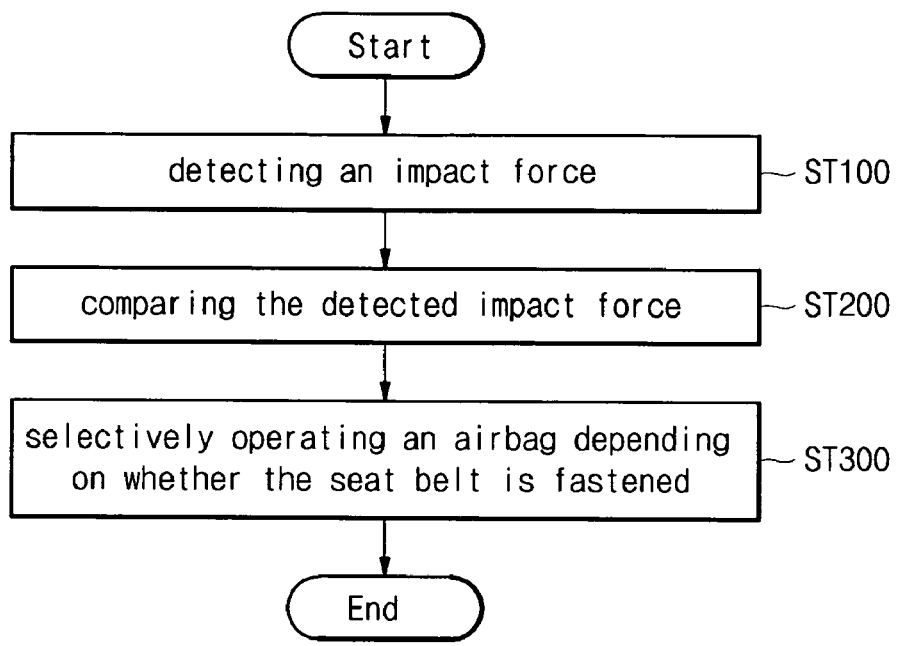
FIG. 11 is a flowchart of a control method of a selectively deployable airbag apparatus for vehicles according to another exemplary embodiment of the present invention.
Figure 12:
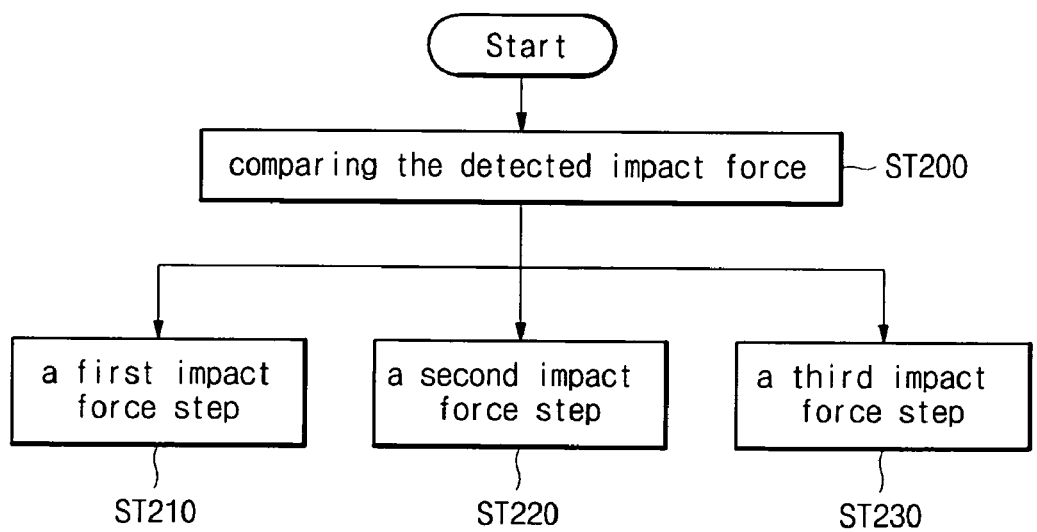
FIG. 12 is a flowchart showing an impact force comparison step of a control method of a selectively deployable airbag apparatus for vehicles according to another exemplary embodiment of the present invention.
Figure 13:
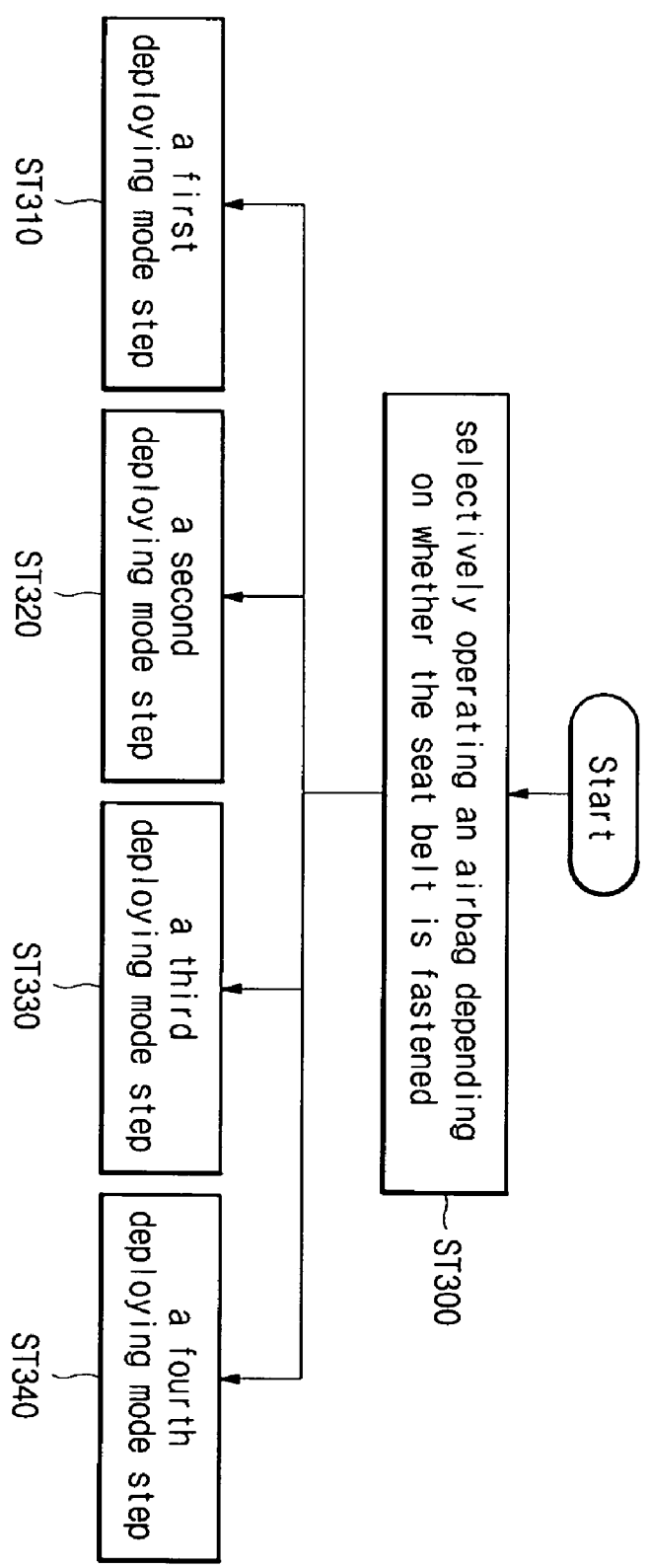
FIG. 13 is a flowchart showing an airbag operation step of a control method of a selectively deployable airbag apparatus for vehicles according to another exemplary embodiment of the present invention.
Figure 14:
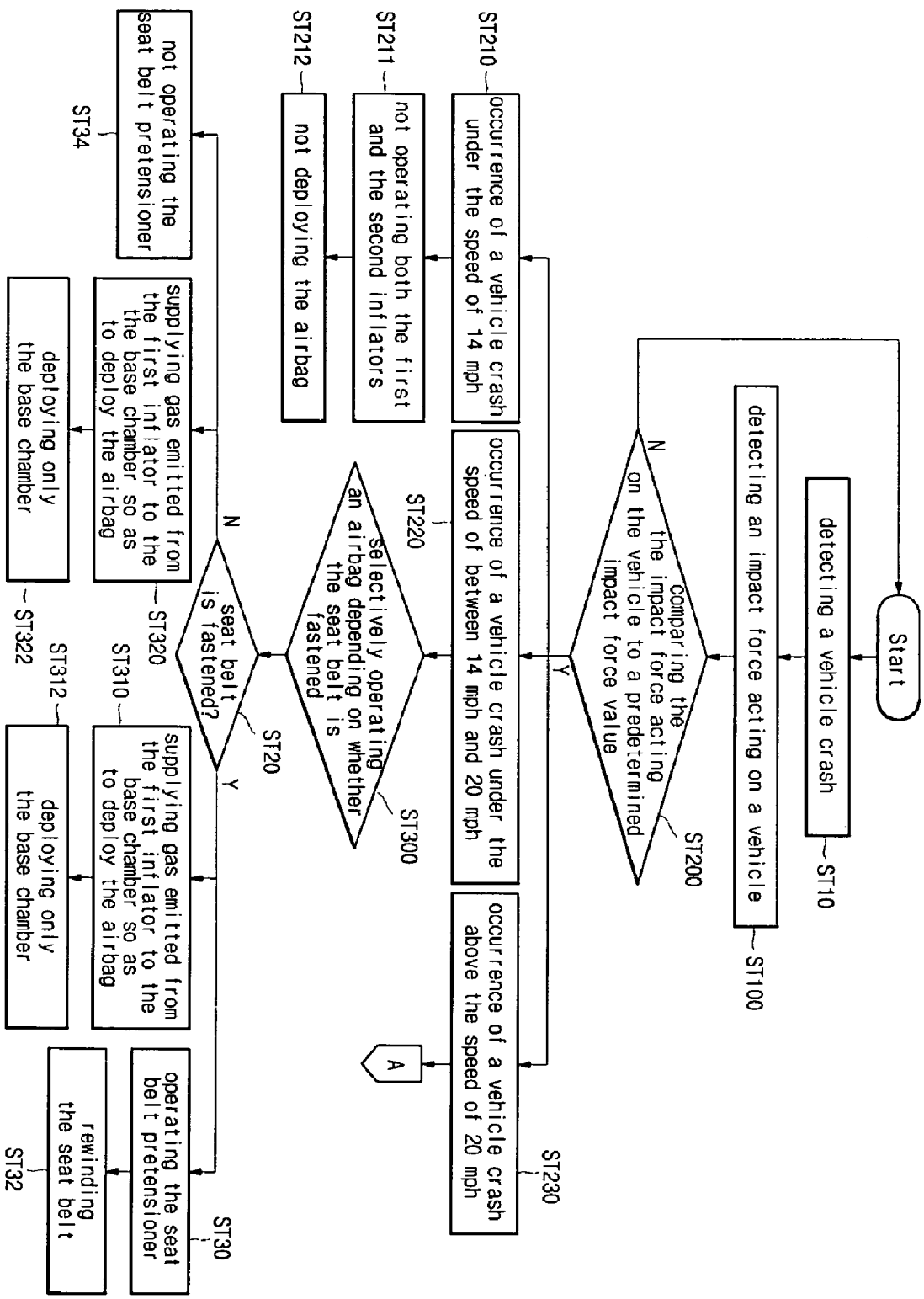
FIG. 14 and FIG. 15 are flowcharts showing operation states of a control method of a selectively deployable airbag apparatus for vehicles according to another exemplary embodiment of the present invention.
Figure 15:
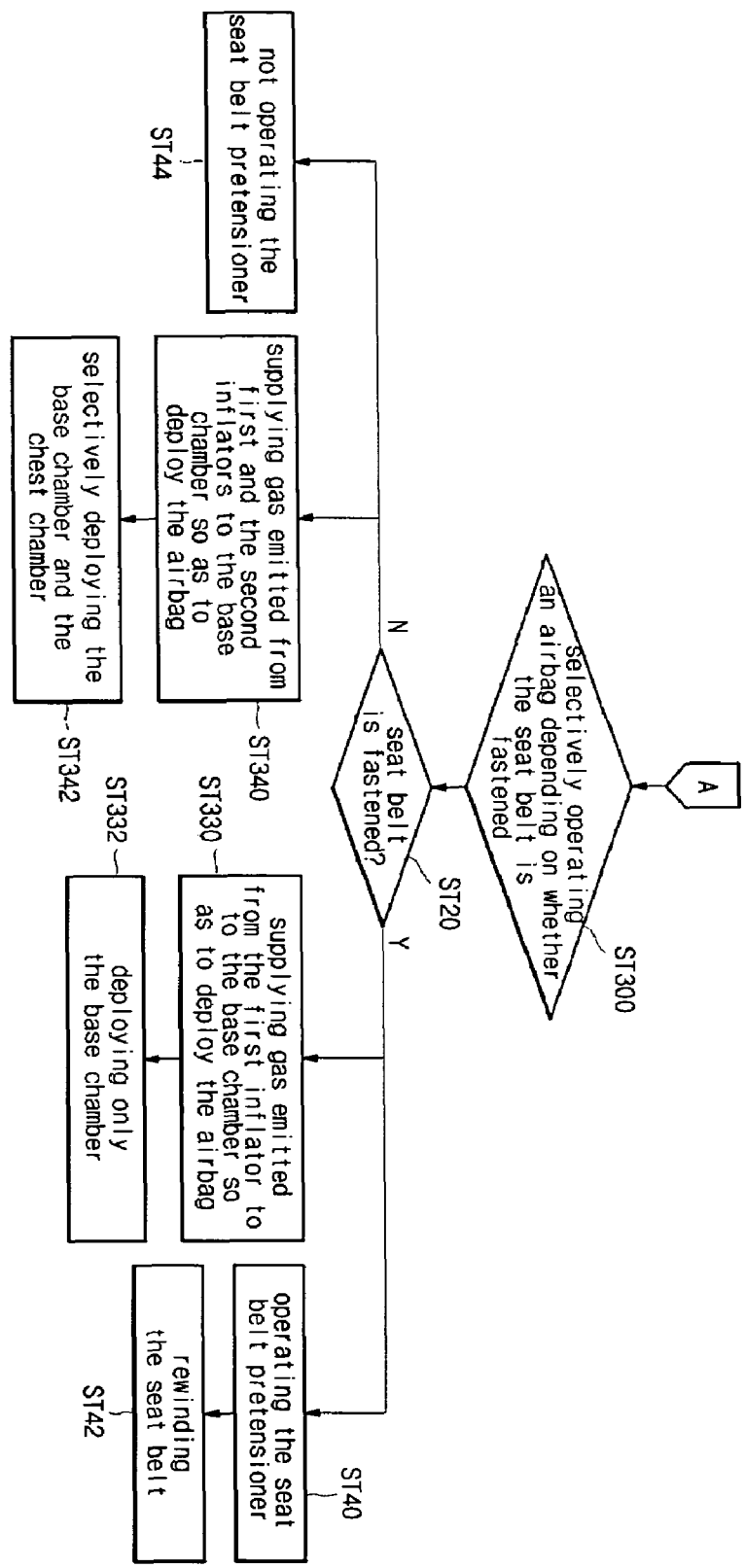

A method of controlling a selectively deployable airbag apparatus for vehicles according to another exemplary embodiment of the present invention will now be explained with reference to FIG. 11 to FIG. 13.

The method includes an impact force detecting step ST100 of detecting an impact force acting on a vehicle body when a front passenger seat is occupied; an impact force comparing step ST200 of comparing the impact force detected at step ST100 to a predetermined value; and an airbag operation step ST300 of determining whether the passenger's seat belt is fastened if the detected impact force is within a set range, and selectively operating the first and second inflators 310 and 320 so as to deploy the airbag 400.

The impact force comparing step ST200 includes a first impact force step ST210 which corresponds to a collision at low speeds, a second impact force step ST220 corresponds to a collision of a vehicle at medium speeds, and a third impact force step ST230 which corresponds to a collision of a vehicle at high speeds.

The first impact force step ST210 may correspond to speeds less than or equal to 14 mph. The second impact force step ST220 may correspond to speeds between 14 mph and 20 mph. The third impact force step ST230 may correspond to speeds higher than or equal to 20 mph.

The airbag operation step ST300 includes a first deploying mode step ST310 in which only the first inflator emits gas, if the passenger's seat belt is fastened and the detected impact force is less than or equal to the second impact force, i.e. the vehicle speed is in the low-medium range (under about 20 mph in exemplary embodiments).

The airbag operation step ST300 includes a second deploying mode step ST320 in which only the first inflator emits gas, if the passenger's seat belt is not fastened and the impact force is less than or equal to the second impact force, i.e. the vehicle is in the low-medium speed range (under about 20 mph in exemplary embodiments).

The airbag operation step ST300 includes a third deploying mode step S330 in which only the first inflator emits gas, if the passenger's seat belt is fastened and the impact force is greater than or equal to the third impact force, i.e. the vehicle is in the high speed range (above about 20 mph in exemplary embodiments).

The airbag operation step ST300 includes a fourth deploying mode step ST340 in which both the first and the second inflators emit gas if the passenger's seat belt is not fastened and the impact force is greater than or equal to the third impact force, i.e. if the vehicle is in the high speed range (above about 20 mph in exemplary embodiments).

The inventive airbag apparatus and control method thereof minimize injuries caused by an airbag deploying at a high speed and injuries on an infant or a child occupying a front passenger seat. Inflator pressure is low compared with the prior art, thereby minimizing airbag deploying pressure acting on a passenger.

Figure 4A:
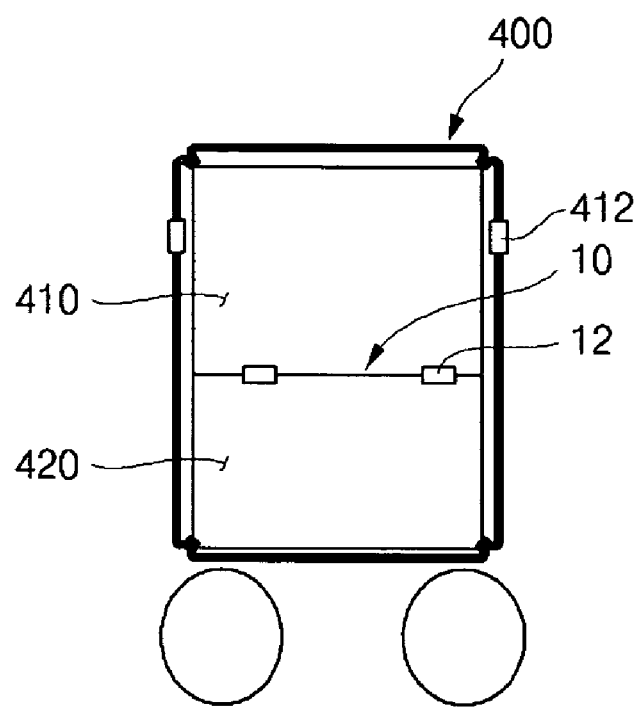
FIG. 4A and FIG. 4B are cross-sectional views respectively taken along lines A-A and B-B of FIG. 3.

Referring to FIG. 4A, an inner space of the airbag 400 is partitioned into the base chamber 410 and the chest chamber 420 by the partition 10 horizontally partitioning the inner space of the airbag 400, and gas can freely move between the chambers 410 and 420 through the inner vent hole 12 depending on a pressure difference therebetween.

Figure 4B:
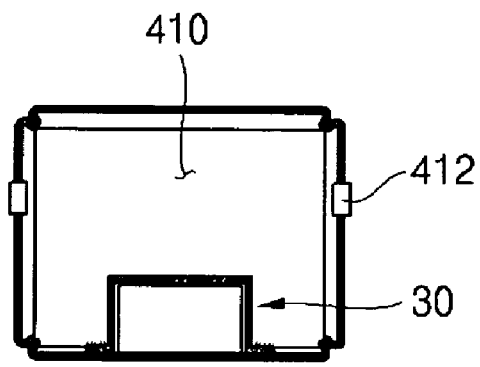

Referring to FIG. 4B, the tube 30 supplying gas emitted from the second inflator 320 to the chest chamber 420 supplies gas from the second inflator 320 to the chest chamber 420.

Figure 5A:
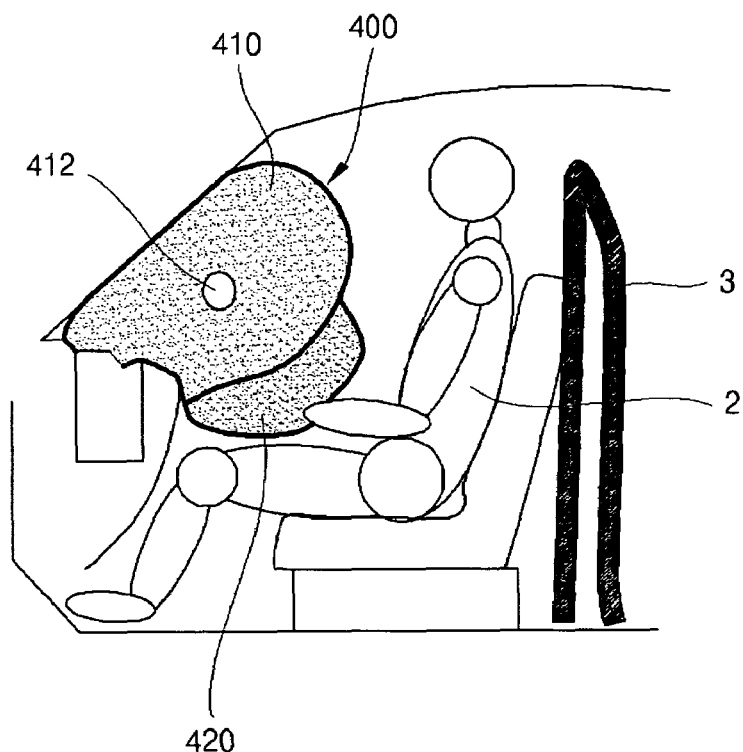
FIG. 5A to FIG. 5C are drawings showing operation states of a selectively deployable airbag apparatus for vehicles according to an exemplary embodiment of the present invention.

If the passenger 2 has not fastened a seat belt 3, the first and the second inflators 310 and 320 both emit gas, so that the airbag 400 deploys in the shape shown in FIG. 5A. The first inflator 310 deploys first so the base chamber 410 is inflated first.

After the base chamber 410 deploys and collides with the passenger 2 thereby absorbing impact energy, the second inflator 320 is deployed, inflating the chest chamber 420 at step ST2-2.

If the passenger 2 has not fastened the seat belt 3, the control unit 500 controls a belt pretensioner (not shown), which is mounted to an end portion of the seat belt 3, not to operate.

If a vehicle crashes with a front vehicle or a structure (not shown) when the passenger 2 rides on the vehicle at step ST1, the control unit 500 determines whether the passenger 2 has fastened the seat belt or not, and operates the airbag 400 to deploy at step ST2.

Figure 5B:
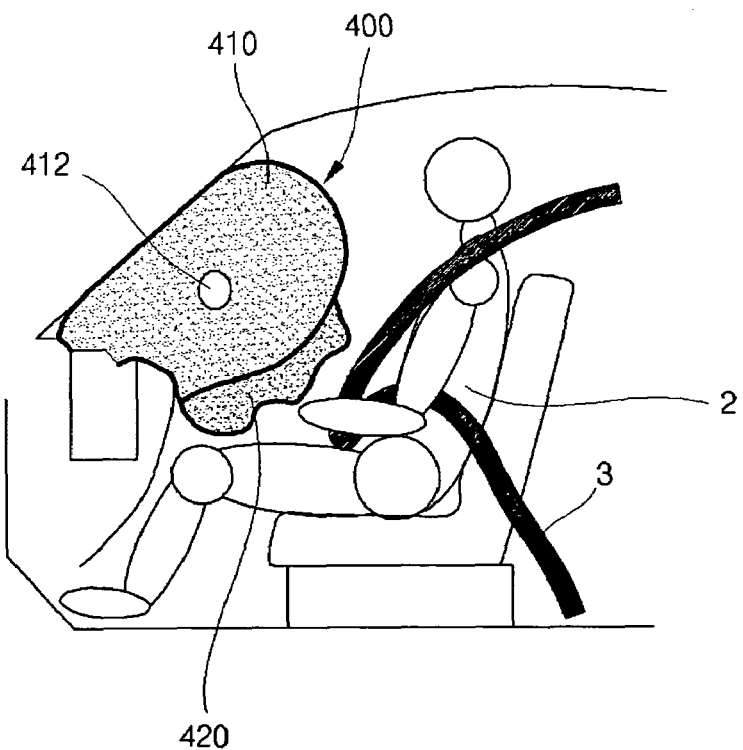

If the passenger 2 has fastened the seat belt 3, gas is emitted from the first inflator 310 (referring to FIG. 2) so that the airbag 400 deploys in a shape as shown in FIG. 5B. The first inflator 310 is deployed and the base chamber 410 is inflated.

The chest of the passenger 2 is restrained by the seat belt 3. The head of the passenger 2 having been moved forwardly by a vehicle collision softly collides with the base chamber 410 so as to discharge a portion of gas through the outer vent hole 412, and a portion of gas moves into the chest chamber 420 through the inner vent hole 12, minimizing impact acting on the passenger 2.

At the same time, the control unit 500 controls a belt pretensioner (not shown), which is installed to an end of the seat belt 3, to operate, at step ST3, so that the seat belt 3 is rewound to protect the passenger 2 at step ST4.

Figure 5C:
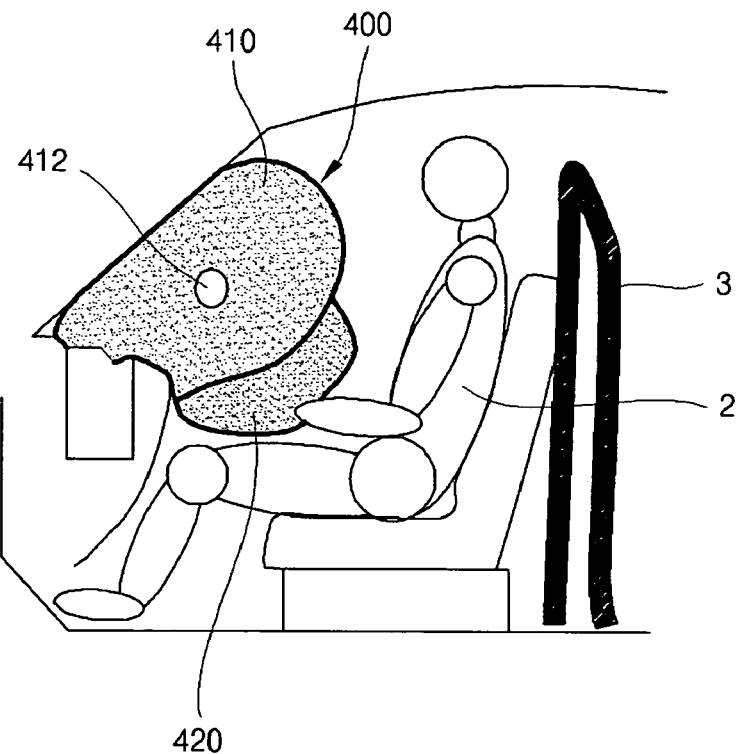
Figure 6:
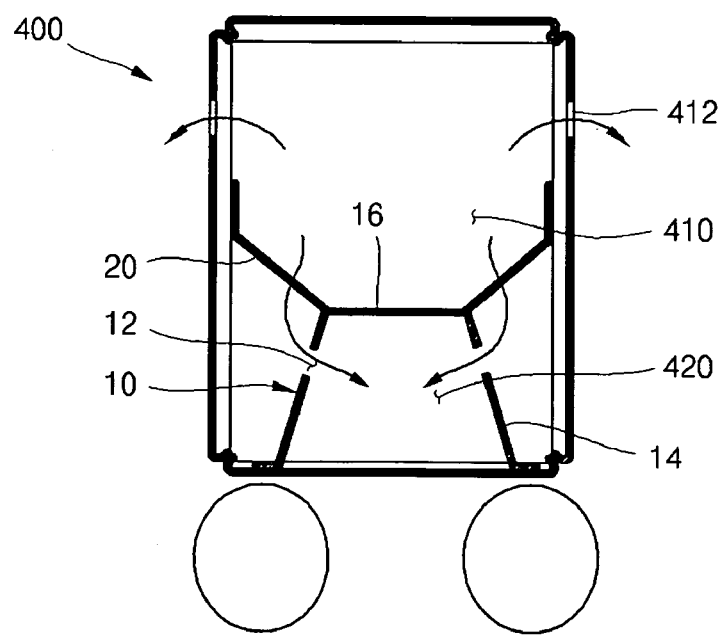
FIG. 6 is a drawing showing a structure of a partition provided to a selectively deployable airbag apparatus for vehicles according to another exemplary embodiment of the present invention.

FIG. 5C shows a state in which a passenger does not fasten a seat belt and shows that an airbag operates in the case that a vehicle collision is less than or equal to a specific level. If a vehicle crash is detected, the first inflator 310 inflates the base chamber 410. Although the seat belt 3 has not been fastened, the second inflator 320 does not operate since the impact is low.

The head of the passenger 2 having been forwardly moved by the vehicle collision softly collides with the deployed base chamber 410 so as to discharge a portion of gas through the outer vent hole 412, and a portion of gas of the first inflator moves to the chest chamber 420□0 through the inner vent hole 12, so that energy of the passenger 2 caused by the vehicle collision is absorbed by the fully inflated base chamber and the partially inflated chest chamber.

Referring to FIGS. 7A to 7E, according to exemplary embodiments, if a vehicle occupied by the passenger 2 collides with a front vehicle or a structure (not shown) at step ST10, the impact detection sensor 100 detects impact acting on the vehicle at step ST100 and transmits a corresponding signal to the control unit 500. At the same time, the seat belt sensor 200 detects whether the seat belt 3 has been fastened or not and transmits a corresponding signal to the control unit 500.

The control unit 500 processes the signals input from the impact detection sensor 100 and the seat belt sensor 200, and deploys the airbag 400. At step ST200, the control unit 500 compares the impact force acting on the vehicle to a predetermined impact force.

In an embodiment of the present invention, the impact force is divided into a first impact force corresponding to a crash under 14 mph (ST210), a second impact force corresponding to a crash between 14 mph and 20 mph (ST220), and a third impact force corresponding to a crash above 20 mph (ST230). The first and the second inflators 310 and 320 are selectively operated according to the impact force so as to selectively deploy the base chamber 410 and the chest chamber 420.

In the case of the first impact force ST210 in which a crash occurs under 14 mph, neither the first nor the second inflator 310 and 320 operate, at step ST211, regardless of whether the passenger 2 has fastened the seat belt 3 or not.

Figure 7A:
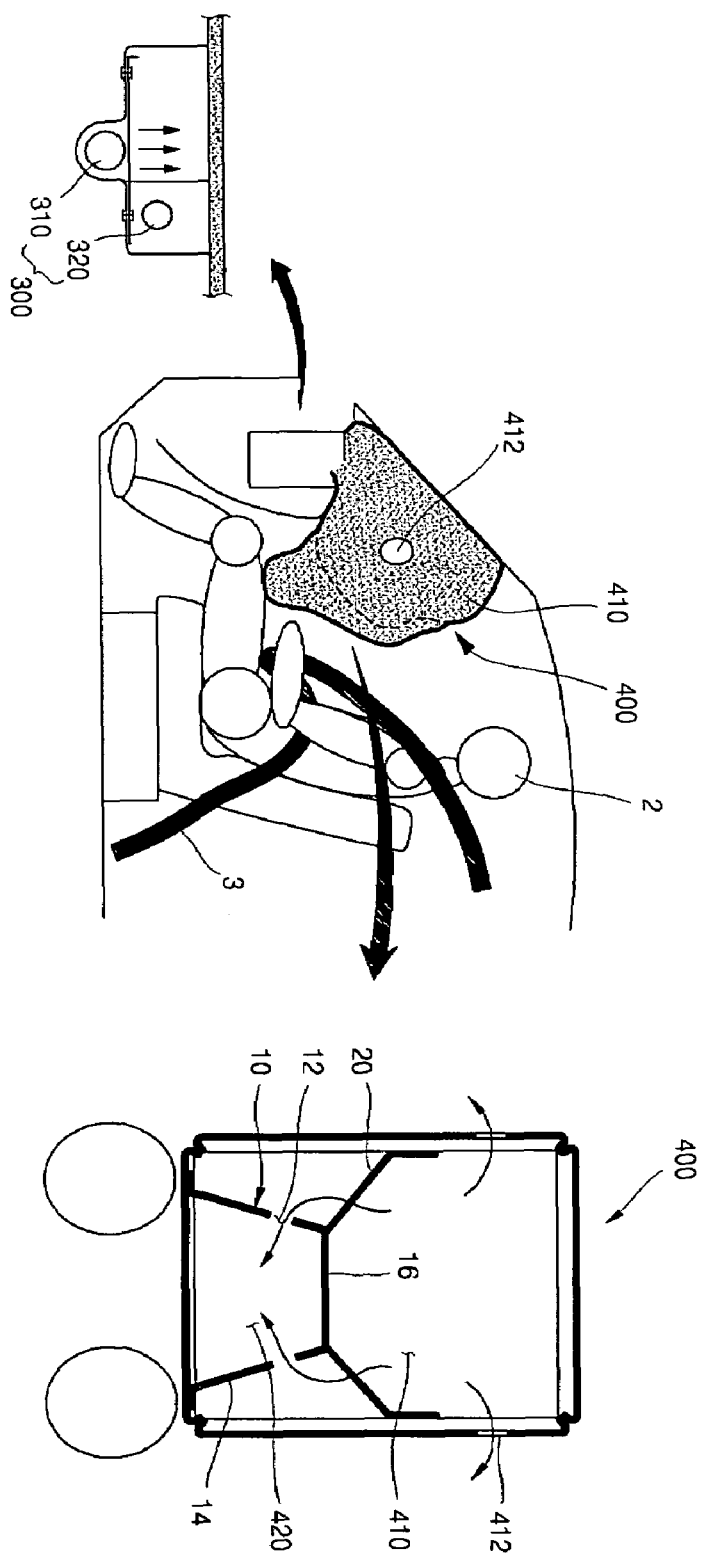
FIG. 7A to FIG. 7E are drawings showing operation states of a selectively deployable airbag apparatus for vehicles according to another exemplary embodiment of the present invention.

Referring to FIG. 7A, in the first deploy mode ST310, in which a collision occurs under 20 mph and the passenger's seat belt 3 is fastened, the control unit 500 applies an operating signal to the first inflator 310 so as to explode a percussion cap or an explosive to selectively operate the first inflator 310 such that the airbag 4 deploys.

Firstly, the seat belt 3 restrains the chest of the passenger 2, and gas emitted from the first inflator 310 flows into the base chamber 410 (ST310).

The base chamber 410 deploys such that it adjoins the knees of the passenger 2 without drooping at step S312, and the second inflator 320 does not deploy.

Since the tether 20 is provided inside the airbag 400, the base chamber 410 stably deploys toward the passenger 2. The base chamber 410 deploys such that it adjoins the knees of the passenger 2 by the structure of the partition 10.

The gas in the base chamber 410 is discharged through the outer vent hole 412 as shown in arrows by the pressure generated by the collision between the base chamber 410 and the passenger 2 such that the gas does not directly contact the body of the passenger 2, preventing injuries of the passenger 2 caused by the discharged gas.

In addition, a portion of gas in the base chamber 410 flows into the chest chamber 420 through the inner vent hole 12 as shown in arrows, so as to minimize an impact on the passenger 2 caused by the deploy force of the airbag 400.

At the same time, in order to minimize the forward movement of the passenger, the control unit 500 operates a belt pretensioner (not shown) installed to an end of the seat belt 3 at step ST30 so as to rewind the seat belt 3 (ST32), thereby restraining the chest of the passenger 2 so as to prevent injuries.

Figure 7B:
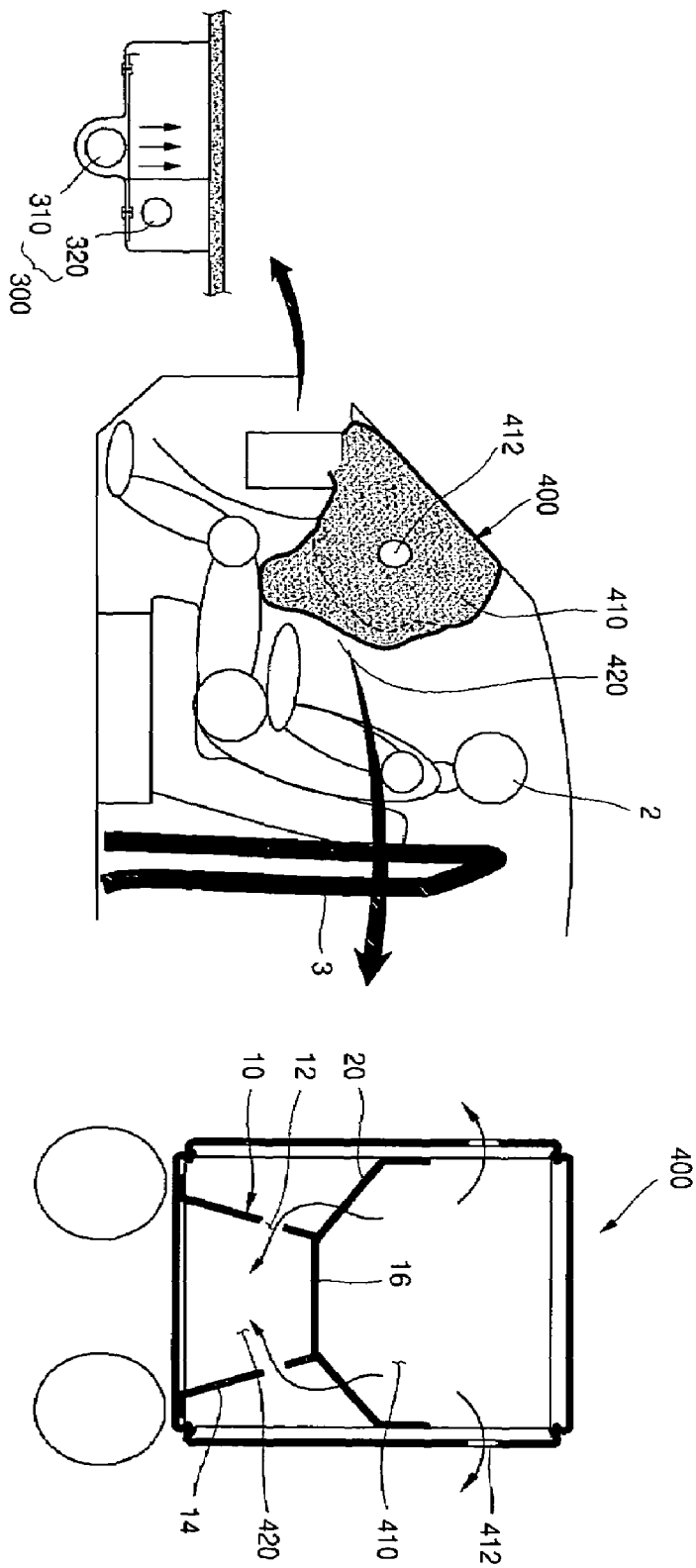

Referring to FIG. 7B, the second deploy mode ST320, in which a crash occurs at less than or equal to 20 mph and the passenger 2 has not fastened the seat belt 3, the control unit 500 applies an operating signal to the first inflator 310 so as to explode a percussion cap or an explosive to selectively operate the first inflator 310 such that the airbag 400 deploys in the second deploy mode ST320.

The base chamber 410 deploys such that it adjoins the knees of the passenger 2 without drooping at step S322, and the second inflator 320 does not deploy. Since the tether 20 is provided, the base chamber 410 stably deploys.

The gas in the base chamber 410 is discharged through the outer vent hole 412 as shown in arrows by the pressure generated by the collision between the base chamber 410 and the passenger 2.

In addition, a portion of gas emitted in the base chamber 410 flows into the chest chamber 420 through the inner vent hole 12, so as to minimize an impact on the passenger 2 caused by the deploy force of the airbag 400.

Because the passenger's seat belt 3 is not fastened, the control unit 500 controls such that the belt pretensioner (not shown) installed to an end of the seat belt 3 does not operate at step ST34, thereby preventing the passenger 2 from being injured.

Figure 7C:
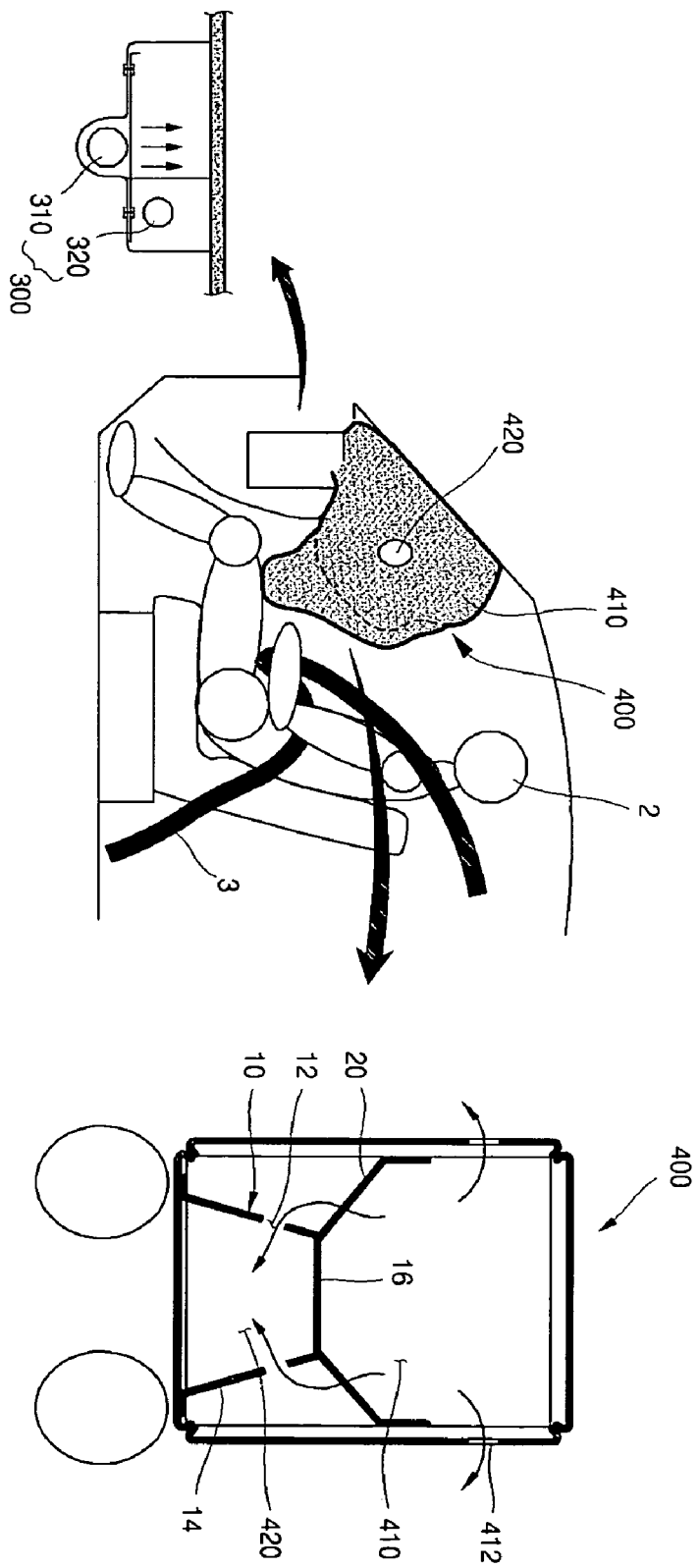

Referring to FIG. 7C, in the third deploy mode ST330, in which a crash occurs at a speed higher than 20 mph and the seat belt 3 is fastened, the control unit 500 applies an operating signal to the first inflator 310 so as to explode a percussion cap or an explosive to selectively operate the first inflator 310 such that the airbag 400 deploys in the third deploy mode ST330.

The chest of the passenger 2 is firstly restrained by the seat belt 3, and the gas emitted from the first inflator 310 instantly inflows into the base chamber 410 so as to deploy the airbag 400 (ST330). The second inflator 320 is not deployed.

The gas in the base chamber 410 is discharged through the outer vent hole 412 as shown in arrows by the pressure generated by the collision between the base chamber 410 and the passenger 2.

In addition, a portion of gas in the base chamber 410 flows into the chest chamber 420 through the inner vent hole 12 as shown in arrows, so as to minimize an impact on the passenger 2 caused by the deploy force of the airbag 400.

At the same time, in order to minimize the forward movement of the passenger, the control unit 500 operates a belt pretensioner (not shown) installed to an end of the seat belt 3 at step ST40 so as to rewind the seat belt 3 (ST42), thereby restraining the chest of the passenger 2 so as to prevent injuries.

Figure 7D:
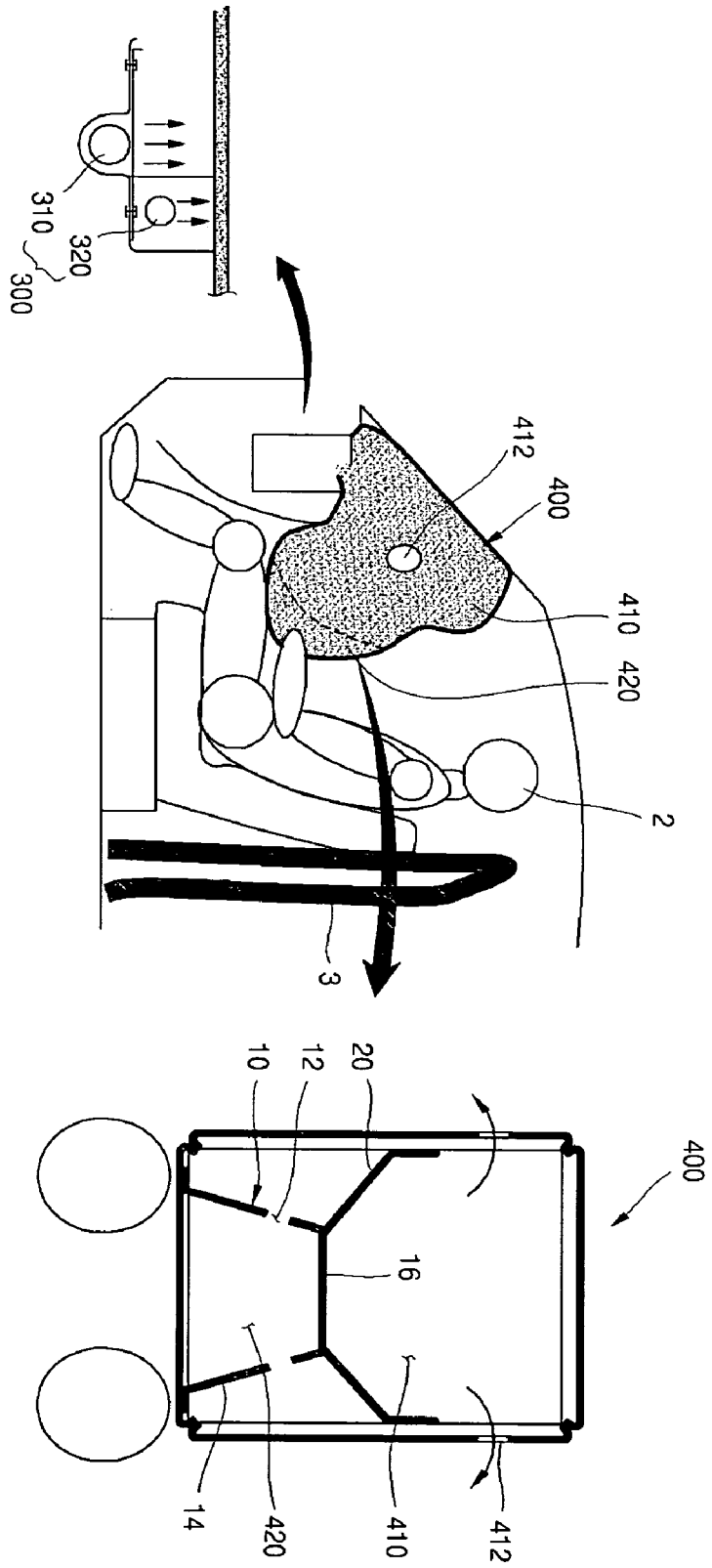

Referring to FIG. 7D, in the fourth deploy mode ST340, in which a crash occurs at a speed higher than 20 mph and the seat belt 3 is not fastened, the control unit 500 applies operating signals to the first inflator 310 and the second inflator 320 such that the airbag 400 deploys in the fourth deploy mode ST340. The control unit 500 first applies an operating signal to the first inflator 310 and then applies an operating signal to the second inflator 320 such that gas is emitted from the first inflator 310 and gas is then emitted from the second inflator 320, thereby regulating deploy timings of the base chamber 410 and the chest chamber 420.

The pressure of the gas of the second inflator 320 may be lower than the pressure of the gas of the first inflator 310. This may help minimize injury.

Since the vehicle crashes at the speed higher than 20 mph in the fourth deploy mode ST340, the collision energy absorbed by the airbag 400 in a state that the passenger 2 has not fastened the seat belt 3 is greater than the impact energy in the first, the second, and the third deploy modes ST310, ST320, and ST330.

There is little gas movement through the inner vent hole 12, and the gas is discharged through the outer vent hole 412.

Since the passenger 2 has not fastened the seat belt 3 in the fourth deploy mode ST340, the (control unit 500 controls the belt pretensioner (not shown) not to operate.

Figure 7E:
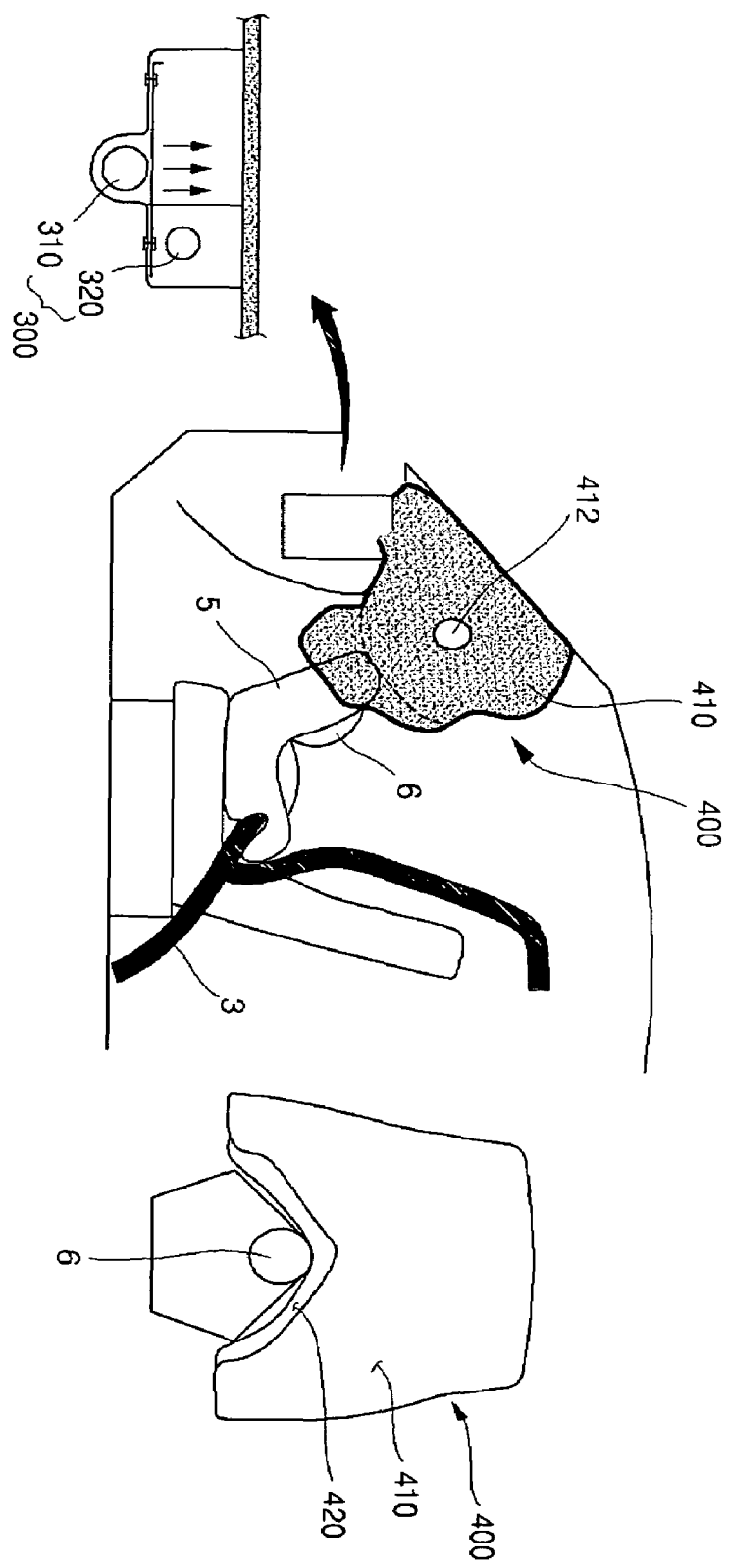

Referring to FIG. 7E, a baby 6 is seated in a child seat 5 firmly fixed by the seat belt 3. If a vehicle crash occurs in this state, a signal value detected by the impact detection sensor 100 (referring to FIG. 1) is input to the control unit 500 (referring to FIG. 1), and the seat belt sensor 200 detects whether the seat belt 3 has been fastened or not and transmits a corresponding detect signal to the control unit 500.

The control unit 500 applies an operating signal to the first inflator 310 such that gas is emitted into the base chamber 410. As shown in the enlarged part of the drawing, the base chamber 410 is deployed, and a minimum deploy pressure acts on the head and the neck of the baby 6 by the deploy shape of the base chamber 410.

Gas of the first inflator 310 supplied into the base chamber 410 is discharged to the outside through the outer vent hole 412 (referring to FIG. 1) by the pressure acting on the base chamber 410 by the collision with the child seat 5 in response to the deploy of the base chamber 410, and a portion of the gas inflows into the chest chamber 420 through the inner vent hole 12 so as to absorb the energy due to the collision thereby preventing the baby from being injured. The control unit 500 operates the belt pretensioner so as to rewind the seat belt, thereby preventing the baby from being injured.

Figure 16:
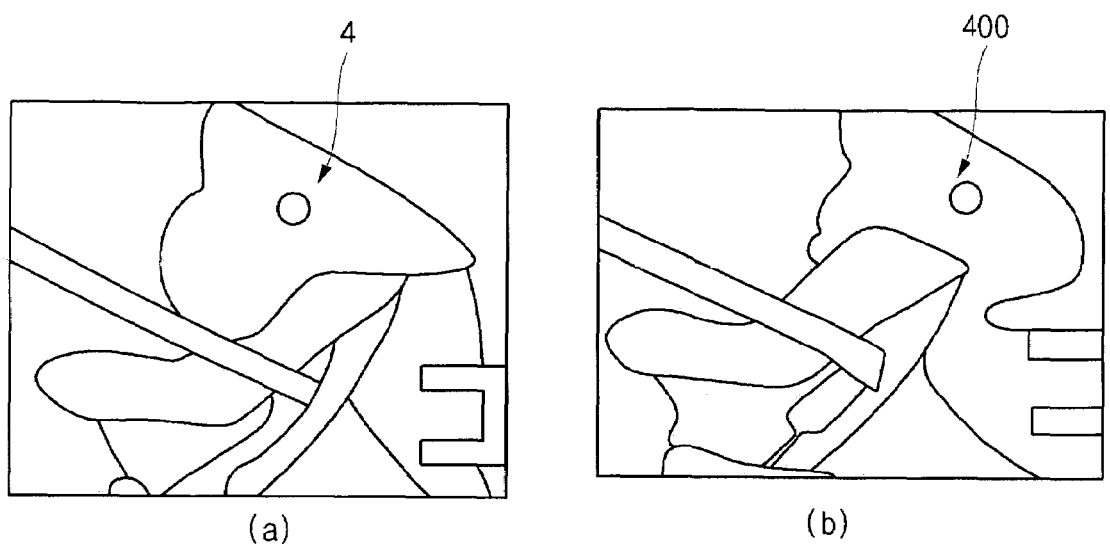
FIG. 16 to FIG. 20 are drawings showing results of comparative experiments of deploy operations of a conventional airbag and a selectively deployable airbag apparatus for vehicles according to an exemplary embodiment of the present invention.
Figure 16:
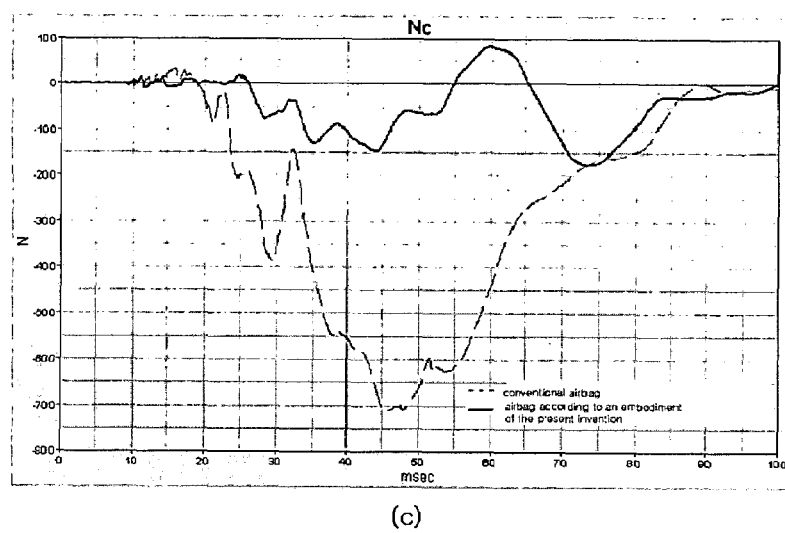
Figure 17:
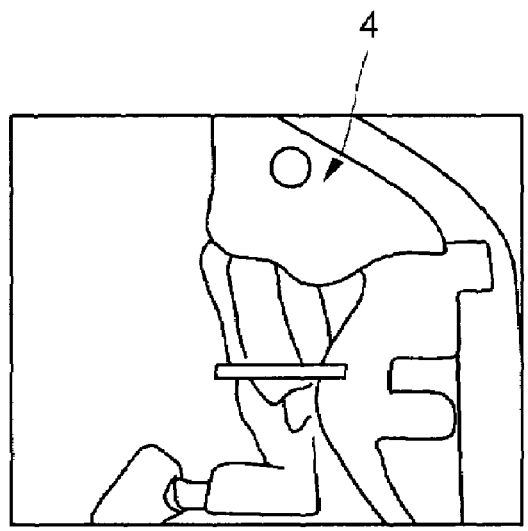
Figure 17:
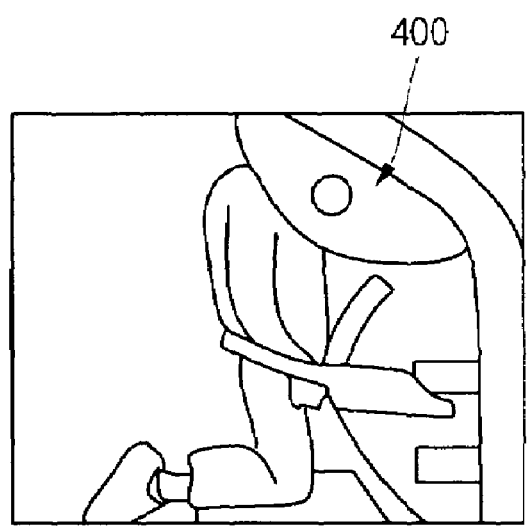
Figure 17:
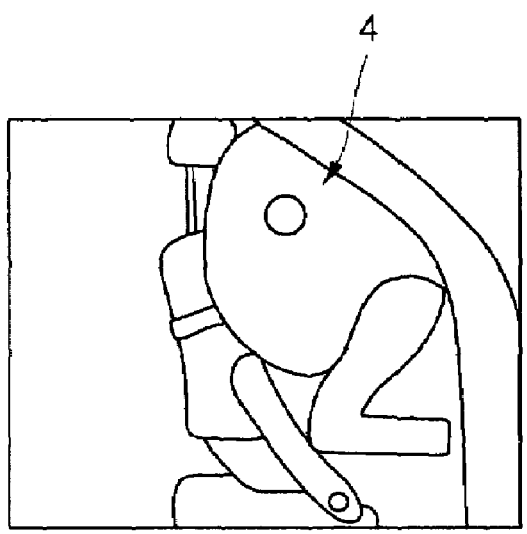
Figure 17:
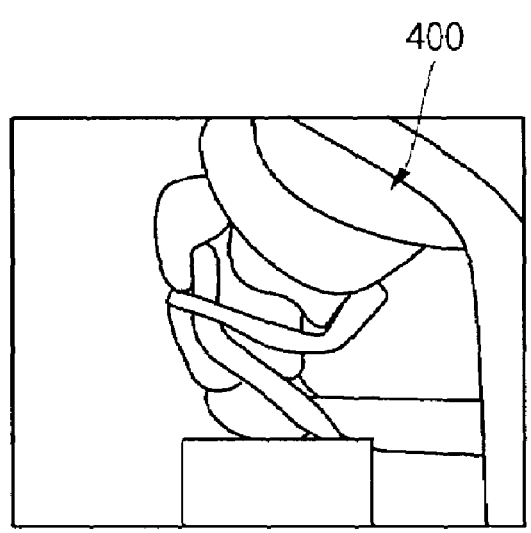
Figure 18:
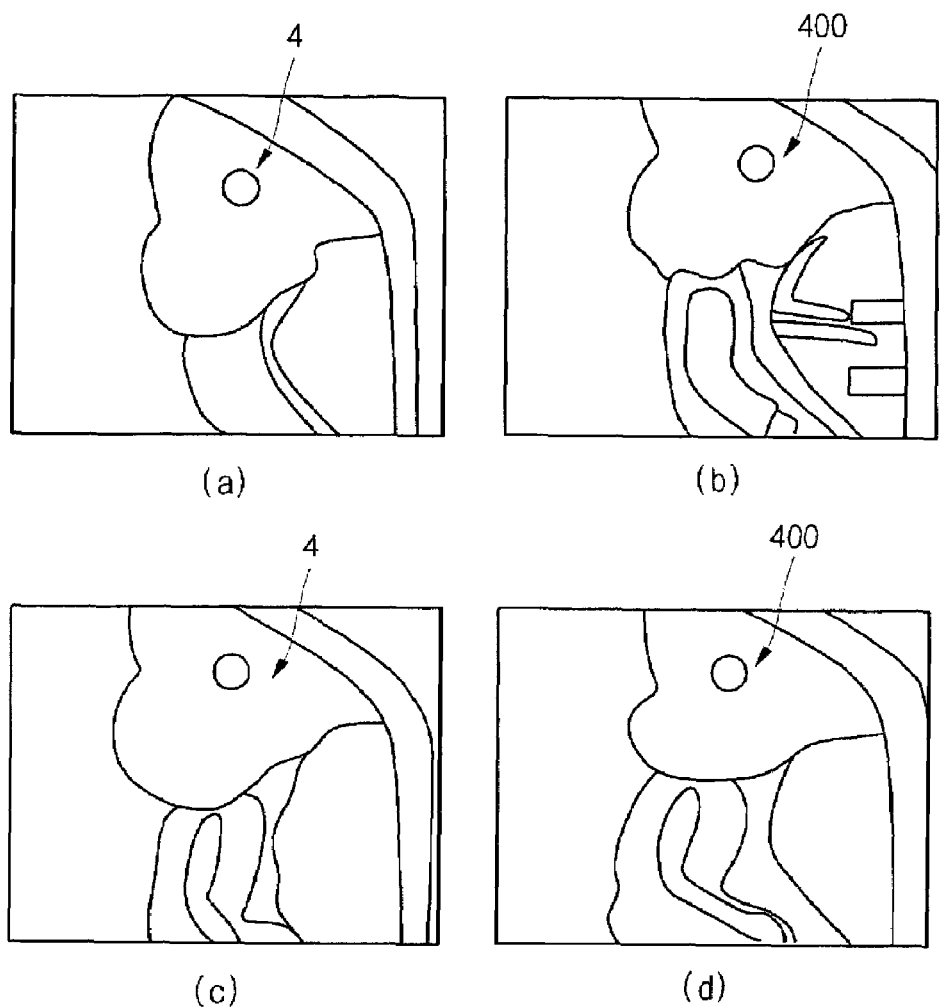
Figure 19:
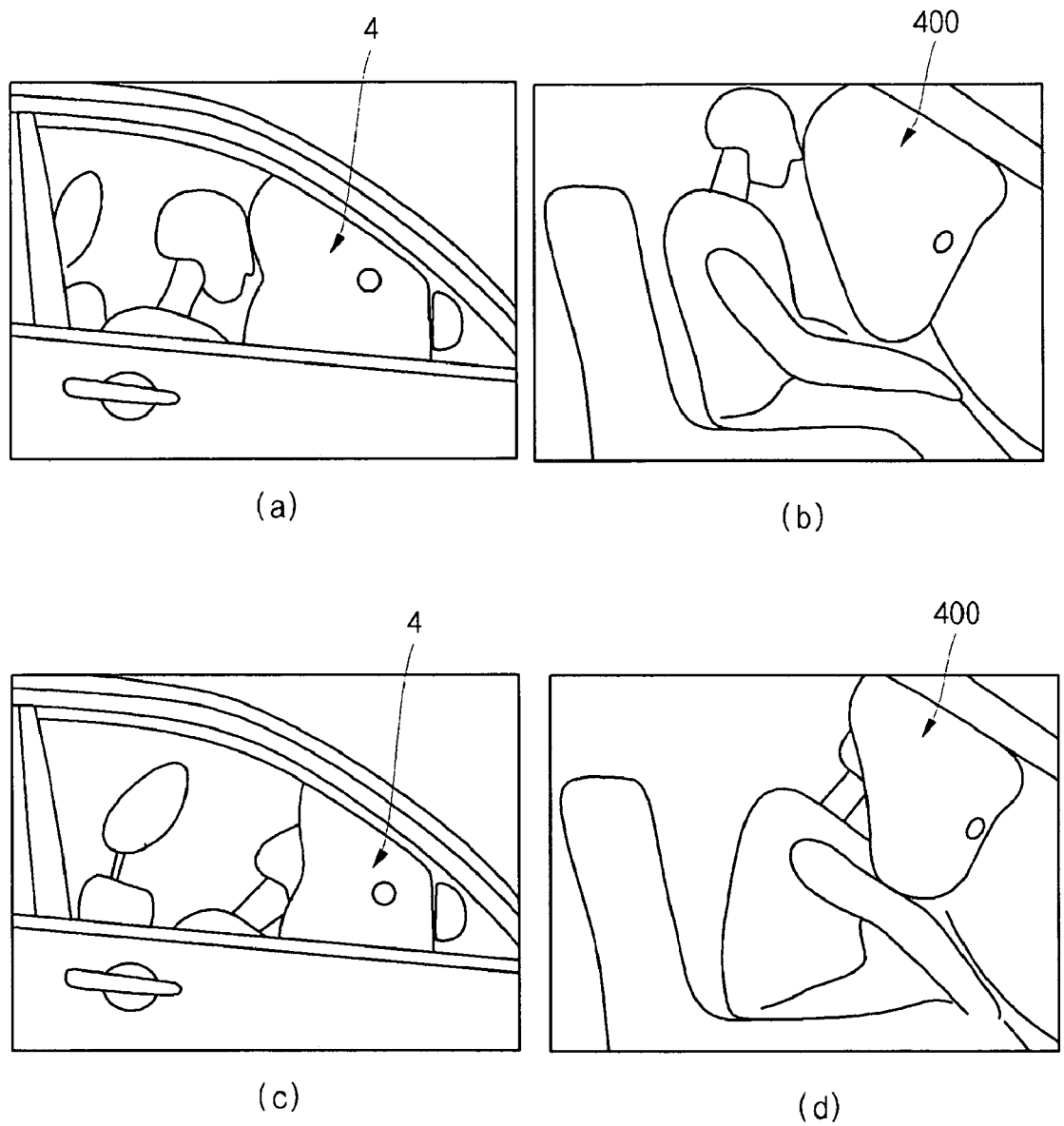
Figure 20:
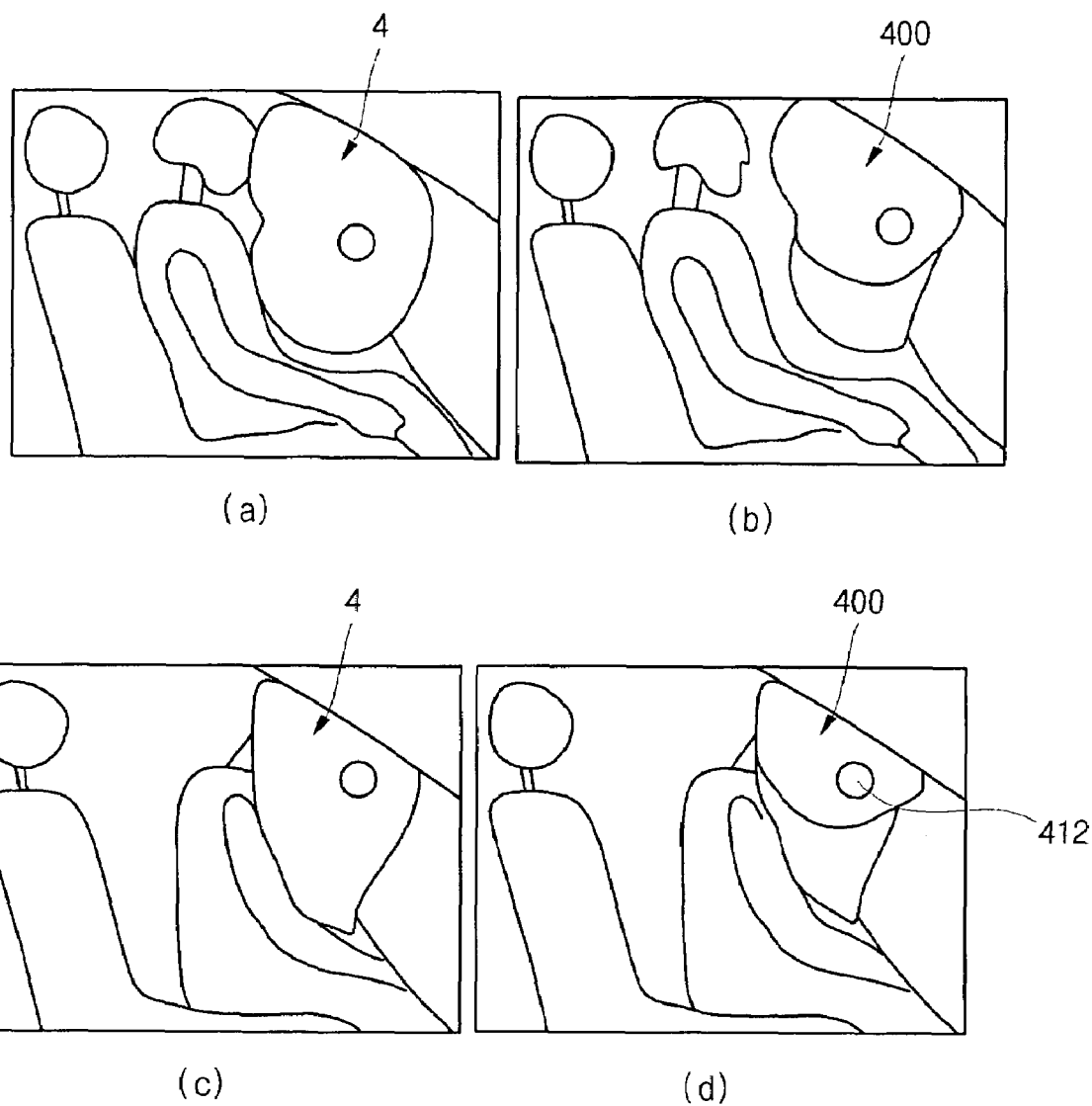

FIG. 16 shows results of comparative experiments for the conventional airbag and an airbag according to an exemplary embodiment of the present invention in a state that a baby is seated in a child seat, FIG. 17 shows results of comparative experiments for the conventional airbag and an airbag according to an exemplary embodiment of the present invention using dummies for a three years old child and for a six years old child in a standing posture, FIG. 18 shows results of comparative experiments for the conventional airbag and an airbag according to an exemplary embodiment of the present invention using dummies for a three years old child and for a six years old child in a seated posture, FIG. 19 shows results of comparative experiments for the conventional airbag and an airbag according to an exemplary embodiment of the present invention when a vehicle crash occurs in a state that the seat belt is fastened, and FIG. 20 shows results of comparative experiments for the conventional airbag and an airbag according to an exemplary embodiment of the present invention when a vehicle crash occurs in a state that the seat belt is not fastened.

Referring to FIG. 16, the child seat manufactured by the same maker is used, dummies for a one year child is used, and experiments are performed in a state that the dummies are restrained by the seat belt with the same tension.

An airbag shown in (a) of FIG. 16 is a conventional airbag 4, and an airbag shown in (b) of FIG. 16 is the airbag 400 according to an exemplary embodiment of the present invention.

As shown in FIG. 16, the conventional airbag 4 deploys to range the neck, the head, and the whole upper body part of the dummy, thereby pressing the neck portion of the dummy.

To the contrary, the airbag 400 according to an exemplary embodiment of the present invention selectively deploys to cover the shoulder and the upper portion of the chest of the dummy.

Graphs shown in (c) of FIG. 16 show neck compressing forces $N_c$, which is force acting on the neck of the dummy, of the conventional airbag 4 and the airbag 400 according to an exemplary embodiment of the present invention.

Referring to (c) of FIG. 16, a horizontal axis (X axis) indicates time lapse during deploy of the airbag in msec, and a vertical axis (Y axis) indicates the neck compressing force in a unit of Newtons.

The conventional airbag applies a maximum force of 710N to the neck of the dummy.

In contrast, the airbag 400 according to an exemplary embodiment of the present invention applies a maximum force of 150N.

FIG. 17 shows results of comparative experiments of a conventional airbag and an airbag of the present invention using dummies for a three-year-old child and for a six-year-old child in a standing position.

Part (a) of FIG. 17 shows a conventional airbag 4 with a dummy for a three-year-old child in a standing position, part (b) of FIG. 17 shows an airbag 400 according to an exemplary embodiment of the present invention with a dummy for a three-year-old child in a standing position, part (c) of FIG. 17 shows a conventional airbag 4 with a dummy for a six-year-old child in a standing position, and part (d) of FIG. 17 shows an airbag 400 according to an exemplary embodiment of the present invention with a dummy for a six-year-old child in a standing position.

As shown in FIG. 17, the conventional airbag 4 collided with the dummy and covers the head, neck, and chest of the dummy. As shown in the part (b) of FIG. 17, in the airbag 400 according to an exemplary embodiment of the present invention, only the base chamber 410 is deployed.

Referring to part (c) of FIG. 17, the conventional airbag 4 collides with the dummy of a six-year-old child while affecting the head, neck, and the whole upper body of the dummy. As shown in the part (d) of FIG. 17, in an exemplary embodiment of the present invention, only the base chamber 410 is deployed.

Part (a) of FIG. 18 shows a conventional airbag 4 with a dummy for a three-year-old child in a seated position, part (b) of FIG. 18 shows an airbag 400 according to an exemplary embodiment of the present invention with a dummy for a three-year-old child in a seated posture, part (c) of FIG. 18 shows a conventional airbag 4 with a dummy for a six-year-old child in a seated position, and part (d) of FIG. 18 shows an airbag 400 according to an exemplary embodiment of the present invention with the dummy for a six-year-old child in a seated position.

As shown in FIG. 18, the conventional airbag 4 collides with the dummy and covers the head, neck, and chest of the dummy. As shown in the part (b) of FIG. 18, in the airbag 400 according to an exemplary embodiment of the present invention, only the base chamber 410 is deployed.

Referring to part (c) of FIG. 18, the conventional airbag 4 collides with the dummy of a six-year-old child while affecting the head and chest of the dummy. In the airbag 400 according to an exemplary embodiment of the present invention as shown in part (d) of FIG. 17, only the base chamber 410 is deployed.

Referring to the part (e) of FIG. 18, the conventional airbag 4 applies a maximum force of about 780 N on the neck of the dummy at 40 msec. In the airbag 400 according to an exemplary embodiment of the present invention, applies a maximum force of about 600 N on the neck of the dummy.

FIG. 19 comparatively shows experiments with the conventional airbag and the airbag according to an exemplary embodiment of the present invention in a vehicle crash with an adult passenger whose seat belt is fastened.

Part (a) of FIG. 19 shows a conventional airbag 60 msec after initial deployment, part (b) of FIG. 19 shows an airbag according to an exemplary embodiment of the present invention 60 msec after initial deployment, part (c) of FIG. 19 shows a conventional airbag 80 msec after initial deployment, and part (d) of FIG. 19 shows an airbag according to an exemplary embodiment of the present invention 80 msec after initial deployment.

Referring to the part (a) of FIG. 19, the conventional airbag 4 collides with the head and a portion of the chest of the passenger, that is, the deploying pressure of the airbag acts on the passenger.

In contrast, referring to the part (b) of FIG. 19, in the airbag 400 according to an exemplary embodiment of the present invention, only the base chamber 410 deploys, so that the airbag does not collide with the passenger.

Referring to part (c) of FIG. 19, the conventional airbag 4 deploys for 80 msec and collides with the passenger, and the head and chest of the passenger are affected by the deploying pressure of the airbag 4.

In contrast, referring to part (d) of FIG. 19, in the airbag 400 according to an exemplary embodiment of the present invention, while the base chamber 410 of the airbag 400 collides with the passenger, gas moves through the outer vent hole 412 and the inner vent hole 12, so that impact force acting on the passenger is substantially decreased.

FIG. 20 comparatively shows experiments with the conventional airbag and the airbag according to an exemplary embodiment of the present invention in a vehicle crash in a state that a seat belt is not fastened.

Part (a) of FIG. 20 shows a conventional airbag 60 msec after initial deployment, part (b) of FIG. 20 shows an airbag according to an exemplary embodiment of the present invention 60 msec after initial deployment, part (c) of FIG. 20 shows a conventional airbag 80 msec after initial deployment, and part (d) of FIG. 20 shows an airbag according to an exemplary embodiment of the present invention 80 msec after initial deployment.

Referring to part (a) of FIG. 20, the conventional airbag 4 deploys for 60 msec and collides with the passenger.

In contrast, referring to part (b) of FIG. 20, the airbag 400 according to an exemplary embodiment of the present invention, the base chamber 410 deploys first and then the chest chamber 420 deploys.

Referring to part (c) of FIG. 20, the conventional airbag 4 deploys for 80 msec and collides with the passenger, and the head and chest of the passenger are affected by the deploying pressure of the airbag 4.

In contrast, referring to part (d) of FIG. 20, in the airbag 400 according to an exemplary embodiment of the present invention, when the base chamber 410 collides with the passenger, gas moves through the outer vent hole 412 and the inner vent hole 12, so that impact force acting on the passenger is substantially decreased.

Figure 21:
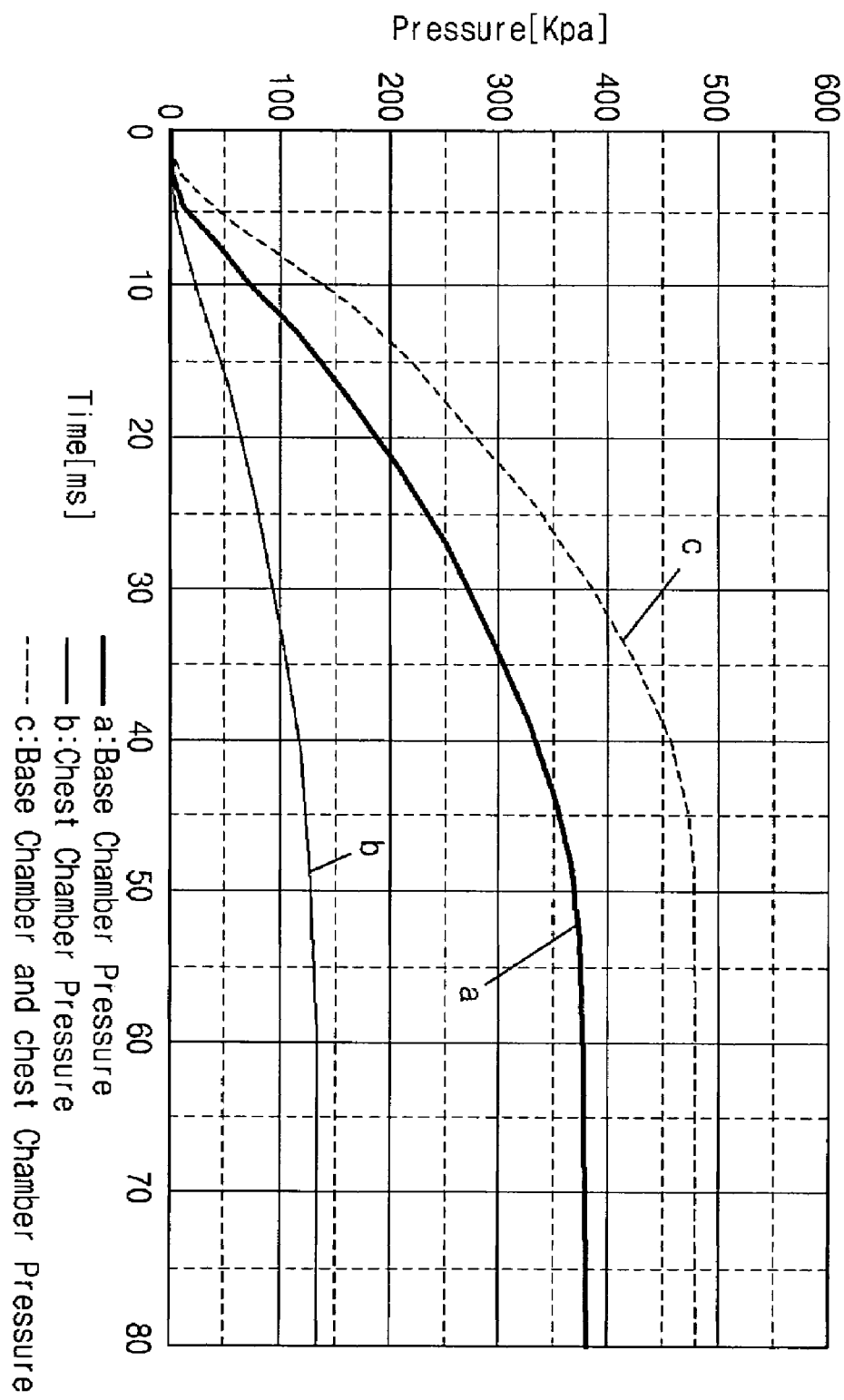
FIG. 21 is a graph showing pressures acting on a base chamber and a chest chamber by an inflator gas pressure of a selectively deployable airbag apparatus for vehicles according to an exemplary embodiment of the present invention.

FIG. 21 shows pressure of the base chamber 410 and chest chamber 420. Line "a" illustrates the pressure of the base chamber 410, line "b" illustrates the pressure of the chest chamber 420, and line "c" illustrates the pressure within the airbag 400 when both the base chamber 410 and the chest chamber 420 deploy.

The horizontal axis (X axis) indicates elapsed time from initial deployment of the airbag 400, and the vertical axis (Y axis) indicates the pressure of the inflator 300.

Referring to line "a", when the first inflator 310 operates, the gas pressure acting on the base chamber 410 approaches a maximum of 370 kPa. Not shown in the drawing, the gas pressure of a conventional airbag is about 480 kPa.

Referring to lines "b" and "c", the pressure acting on the chest chamber 420 approaches a maximum of 110 kPa, and when both the base chamber 410 and the chest chamber 420 deploy, the pressure approaches a maximum of 480 kPa.

As described above, in the airbag according to the present invention, the deploying pressure acting on the passenger is minimized so that injuries may be minimized. It should be understood that a capacity of absorbing impact of the airbag 400 can be changed by varying the diameter and the shape of the inner vent hole 12.

Energy absorbing performance can be optimized by selecting an appropriate size and number of the outer vent hole 412 and the inner vent hole 12.

In addition, the airbag can be optimally deployed without an expensive passenger detection sensor for sensing a position of the passenger occupying the front passenger seat.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A selectively deployable airbag apparatus, comprising:
an impact detection sensor detecting an impact acting on a vehicle body;
a seat belt sensor detecting whether or not a seat belt is fastened;
an airbag comprising a base chamber and a chest chamber, said chambers being separated from each other by a partition comprising at least one inner vent hole such that the base chamber and the chest chamber are in fluid communication with each other through the inner vent hole;
a first inflator for inflating the base chamber;
a second inflator for inflating the chest chamber; and
a controller for deploying the airbag, wherein said controller receives signals from the impact detection sensor and the seat belt sensor, and determines whether to deploy the chest chamber or not based on the signals;
wherein the second inflator is disposed within the chest chamber.

2. A selectively deployable airbag apparatus, comprising:
an impact detection sensor detecting an impact acting on a vehicle body;
a seat belt sensor detecting whether or not a seat belt is fastened;
an airbag comprising a base chamber and a chest chamber, said chambers being separated from each other by a partition comprising at least one inner vent hole such that the base chamber and the chest chamber are in fluid communication with each other through the inner vent hole;
a first inflator for inflating the base chamber;
a second inflator for inflating the chest chamber; and
a controller for deploying the airbag, wherein said controller receives signals from the impact detection sensor and the seat belt sensor, and determines whether to deploy the chest chamber or not based on the signals;
wherein the second inflator is attached to a front portion of an airbag housing within the chest chamber.

3. The apparatus of claim 2, wherein the second inflator uses a pressure lower than a pressure of the first inflator.

4. The apparatus of claim 2, wherein gas supplied into the base chamber from the first inflator moves into the chest chamber through the inner vent hole by pressure caused by a collision of the base chamber and an occupant.

5. The apparatus of claim 2, wherein the second inflator emits gas after a predetermined time delay from a time of gas emission of the first inflator.

6. The apparatus of claim 2, wherein the inner vent hole comprises a substantially circular or quadrangular shape.

7. The apparatus of claim 2, wherein the partition is disposed substantially horizontally or is slanted such that an upper end thereof is slanted toward an occupant.

8. The apparatus of claim 2, wherein a first end of the partition is attached to an inner side of an airbag housing and is forwardly extended, and a second end of the partition is connected to an inner side of a front end of the airbag.

9. The apparatus of claim 2, wherein the base chamber has a greater volume than the chest chamber and has a size sufficient to protect a head of an occupant can be protected, and the chest chamber has a size sufficient to protect a body part below a chest of the occupant.

10. The apparatus of claim 2, wherein the base chamber has a shape such that lower ends thereof are deployed to be adjacent to knees of an occupant when the airbag is deployed, and the chest chamber has a shape such that it is disposed between the lower ends of the base chamber when the airbag is deployed.

11. The apparatus of claim 2, wherein the airbag further comprises at least one outer vent hole through which gas can be discharged.

12. The apparatus of claim 11, wherein the outer vent hole is disposed at a position at which gas is not discharged directly to an occupant.

13. The apparatus of claim 2, further comprising at least one tube through which gas generated by the second inflator is supplied, disposed inside the chest chamber.

14. The apparatus of claim 13, wherein the at least one tube is disposed substantially at a center of the chest chamber or at both sides of the chest chamber.

15. The apparatus of claim 2, wherein the controller controls such that gas of the first inflator is supplied to the base chamber and the chest chamber is supplied with gas from the base chamber, or such that both the first inflator and the second inflator emit gas thereby supplying gas to both the base chamber and the chest chamber so that gas moves according to a pressure difference between the base chamber and the chest chamber, wherein the controller selectively controls the first inflator and the second inflator based on the signals.

16. A selectively deployable airbag apparatus, comprising:
- an impact detection sensor detecting an impact acting on a vehicle body;
- a seat belt sensor detecting whether or not a seat belt is fastened;
- an airbag comprising a base chamber and a chest chamber, said chambers being separated from each other by a partition comprising at least one inner vent hole such that the base chamber and the chest chamber are in fluid communication with each other through the inner vent hole;
- a first inflator for inflating the base chamber;
- a second inflator for inflating the chest chamber; and
- a controller for deploying the airbag, wherein said controller receives signals from the impact detection sensor and the seat belt sensor, and determines whether to deploy the chest chamber or not based on the signals;
- wherein the partition comprises a first partition comprising two end portions spaced from each other at a left side and a right side of an inner bottom of the airbag and upwardly extended, and a second partition horizontally extended and connected to both upper end portions of the first partition.

17. The apparatus of claim 16, wherein the at least one inner vent hole comprises a first inner vent hole at a left side of the first partition and a second inner vent hole at a right side of the first partition.

18. The apparatus of claim 16, further comprising a tether, wherein a first end of the tether is attached to an inner side of the airbag, and a second end of the tether is attached to the second partition.

* * * * *